US012785112B2

(12) United States Patent
Prinz et al.

(10) Patent No.: US 12,785,112 B2
(45) Date of Patent: Nov. 3, 2026

(54) SCALABLE ROLL-TO-ROLL FABRICATION OF HIGH-PERFORMANCE MEMBRANE ELECTRODE ASSEMBLIES

(71) Applicants: Board of Trustees of the Leland Stanford Junior University, Stanford, CA (US); Volkswagen Aktiengesellschaft, Wolfsburg (DE)

(72) Inventors: Friedrich B. Prinz, Stanford, CA (US); Timothy Goh, Stanford, CA (US); Shicheng Xu, Stanford, CA (US); Zhaoxuan Wang, Stanford, CA (US); Soonwook Hong, Stanford, CA (US); Yongmin Kim, Stanford, CA (US); Samuel Dull, Stanford, CA (US); Dong Un Lee, Stanford, CA (US); Thomas Francisco Jaramillo, Stanford, CA (US); Thomas Schladt, Wolfsburg (DE); Gerold Huebner, Wolfsburg (DE); Jonathan Müller, Wolfsburg (DE); Glavas Vedran, Wolfsburg (DE)

(73) Assignees: Board of Trustees of the Leland Stanford Junior University, Stanford, CA (US); Volkswagen Aktiengesellschaft, Wolfsburg (DE)

( * ) Notice: Subject to any disclaimer, the term of this patent is extended or adjusted under 35 U.S.C. 154(b) by 755 days.

(21) Appl. No.: 17/799,647

(22) PCT Filed: Feb. 12, 2021

(86) PCT No.: PCT/US2021/017979
§ 371 (c)(1),
(2) Date: Aug. 12, 2022

(87) PCT Pub. No.: WO2021/163579
PCT Pub. Date: Aug. 19, 2021

(65) Prior Publication Data

US 2023/0079048 A1 Mar. 16, 2023

Related U.S. Application Data

(63) Continuation of application No. 16/791,650, filed on Feb. 14, 2020, now Pat. No. 11,462,744.

(51) Int. Cl.
*H01M 4/88* (2006.01)
*H01M 4/92* (2006.01)
*H01M 8/1004* (2016.01)

(52) U.S. Cl.
CPC ......... *H01M 4/8807* (2013.01); *H01M 4/881* (2013.01); *H01M 4/8892* (2013.01); *H01M 4/926* (2013.01); *H01M 8/1004* (2013.01)

(58) Field of Classification Search
CPC .................................................. H01M 4/8807
See application file for complete search history.

(56) References Cited

U.S. PATENT DOCUMENTS 8,647,723 B2 2/2014 Kongkanand et al.
9,325,017 B2 4/2016 Fay
(Continued)

FOREIGN PATENT DOCUMENTS

CN 101986450 A 3/2011
DE 10 2011 116 358 A1 4/2012
(Continued)

OTHER PUBLICATIONS

Extended Search Report on European Application No. 21754285.1 dated Feb. 24, 2025 (7 pages).
(Continued)

*Primary Examiner* — Brian R Ohara
(74) *Attorney, Agent, or Firm* — Foley & Lardner LLP

(57) ABSTRACT

A manufacturing process includes: depositing a first catalyst on a first gas diffusion layer (GDL) to form a first catalyst-
(Continued)

coated GDL; depositing a first ionomer on the first catalyst-coated GDL to form a first gas diffusion electrode (GDE); depositing a second catalyst on a second GDL to form a second catalyst-coated GDL; depositing a second ionomer on the second catalyst-coated GDL to form a second GDE; and laminating the first GDE with the second GDE and with an electrolyte membrane disposed between the first GDE and the second GDE to form a membrane electrode assembly (MEA). A MEA includes a first GDL; a second GDL; an electrolyte membrane disposed between the first GDL and the second GDL; a first catalyst layer disposed between the first GDL and the electrolyte membrane; and a second catalyst layer disposed between the second GDL and the electrolyte membrane, wherein a thickness of the electrolyte membrane is about 15 μm or less.

18 Claims, 19 Drawing Sheets

(56) References Cited

U.S. PATENT DOCUMENTS

| | | | | |
|---|---|---|---|---|
| 2010/0159298 | A1 | 6/2010 | Haug | |
| 2010/0239921 | A1 | 9/2010 | Fan | |
| 2012/0034548 | A1* | 2/2012 | Okuyama | H01M 4/8807 429/480 |
| 2016/0079604 | A1 | 3/2016 | Atanasoski et al. | |
| 2019/0221874 | A1* | 7/2019 | Saito | H01B 1/06 |
| 2020/0411879 | A1 | 12/2020 | Hartman et al. | |
| 2021/0005912 | A1 | 1/2021 | Kunita et al. | |
| 2021/0257629 | A1 | 8/2021 | Prinz et al. | |
| 2021/0265638 | A1 | 8/2021 | Azra | |
| 2021/0384521 | A1 | 12/2021 | Breitwieser et al. | |

FOREIGN PATENT DOCUMENTS

| | | | | | |
|---|---|---|---|---|---|
| JP | 2013534707 | | * | 9/2013 | |
| KR | 20160039375 | | * | 4/2016 | H01M 4/8807 |
| WO | WO-2016149168 | A1 | * | 9/2016 | |
| WO | WO-2018/049065 | A1 | | 3/2018 | |
| WO | WO-2018/231998 | A1 | | 12/2018 | |
| WO | WO-2019/239399 | A1 | | 12/2019 | |
| WO | WO-2020022191 | A1 | * | 1/2020 | H01M 4/8605 |

OTHER PUBLICATIONS

CN Office Action on CN Appl. No. 202180027077.6 dated May 14, 2025 (11 pages with English language translation).

* cited by examiner

SCALABLE ROLL-TO-ROLL FABRICATION OF HIGH-PERFORMANCE MEMBRANE ELECTRODE ASSEMBLIES

CROSS-REFERENCE TO RELATED APPLICATIONS

This application is a National Stage Entry under 35 U.S.C. § 371 of International Application No. PCT/US2021/017979, filed Feb. 12, 2021, which claims the benefit of and priority to U.S. patent application Ser. No. 16/791,650, filed on Feb. 14, 2020, the contents of which are incorporated herein in their entirety.

TECHNICAL FIELD

This disclosure generally relates to a membrane electrode assembly (MEA) for proton exchange membrane fuel cells.

BACKGROUND

Commercial viability of mass market fuel cell-powered vehicles remains hindered by high costs of precious metal-based catalysts, a key component in proton exchange membrane fuel cells (PEMFCs). While significant efforts to develop catalysts to reduce such costs have yielded promising results, producing these catalysts and integrating them into MEAS can involve significantly more precision and processing complexity than would be feasible for production at commercial scales.

It is against this background that a need arose to develop embodiments of this disclosure.

SUMMARY

In some embodiments, a manufacturing process includes: depositing a first catalyst on a first gas diffusion layer to form a first catalyst-coated gas diffusion layer; depositing a first ionomer on the first catalyst-coated gas diffusion layer to form a first gas diffusion electrode; depositing a second catalyst on a second gas diffusion layer to form a second catalyst-coated gas diffusion layer; depositing a second ionomer on the second catalyst-coated gas diffusion layer to form a second gas diffusion electrode; and laminating the first gas diffusion electrode with the second gas diffusion electrode and with an electrolyte membrane disposed between the first gas diffusion electrode and the second gas diffusion electrode to form a membrane electrode assembly.

In some embodiments, a manufacturing process includes: depositing a first catalyst on a first gas diffusion layer to form a catalyst-coated gas diffusion layer; depositing an ionomer on the catalyst-coated gas diffusion layer to form a gas diffusion electrode; forming an electrolyte membrane on the gas diffusion electrode, depositing a second catalyst on the electrolyte membrane to form a catalyst-coated gas diffusion electrode; and laminating the catalyst-coated gas diffusion electrode with a second gas diffusion layer to form a membrane electrode assembly.

In some embodiments, a membrane electrode assembly for a fuel cell includes: a first gas diffusion layer; a second gas diffusion layer; an electrolyte membrane disposed between the first gas diffusion layer and the second gas diffusion layer; a first catalyst layer disposed between the first gas diffusion layer and the electrolyte membrane; and a second catalyst layer disposed between the second gas diffusion layer and the electrolyte membrane, wherein a thickness of the electrolyte membrane is about 15 μm or less.

In some embodiments, a fuel cell includes the membrane electrode assembly of any of the foregoing embodiments.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 14(*b*). Schematic of graphene sheets as a catalyst support deposited on a GDL.

FIG. 15(*b*). Schematic of deposits of a catalyst on graphene sheets deposited on a GDL.

FIG. 15(*c*). Schematic of deposits of a catalyst on a GDL.

FIG. 16(*b*). Schematic of a catalyst layer on a GDL.

DESCRIPTION

By way of contrasting with an improved manufacturing process explained further below, a comparative process of manufacturing a MEA involves (1) forming a catalyst ink composition in which a precious metal catalyst is pre-deposited onto a catalyst support (e.g., a carbon black powder); (2) depositing the ink composition, such as by spray-coating, on gas diffusion layers (GDLs) to form catalyst-coated GDLs; and (3) pressing two catalyst-coated GDLs onto opposite surfaces of a pre-formed electrolyte membrane to form the MEA. The comparative process hinders the performance of the resulting MEA due to (a) insufficient control over structures of the pre-deposited catalyst and its loading (e.g., insufficient ability to optimize or otherwise tune an electrochemically active surface area for a given amount of the catalyst); and (b) high transport resistance of the pre-formed electrolyte membrane, due to a minimum specified thickness of the pre-formed membrane in order to mechanically withstand handling and processing stages.

Figure 13:
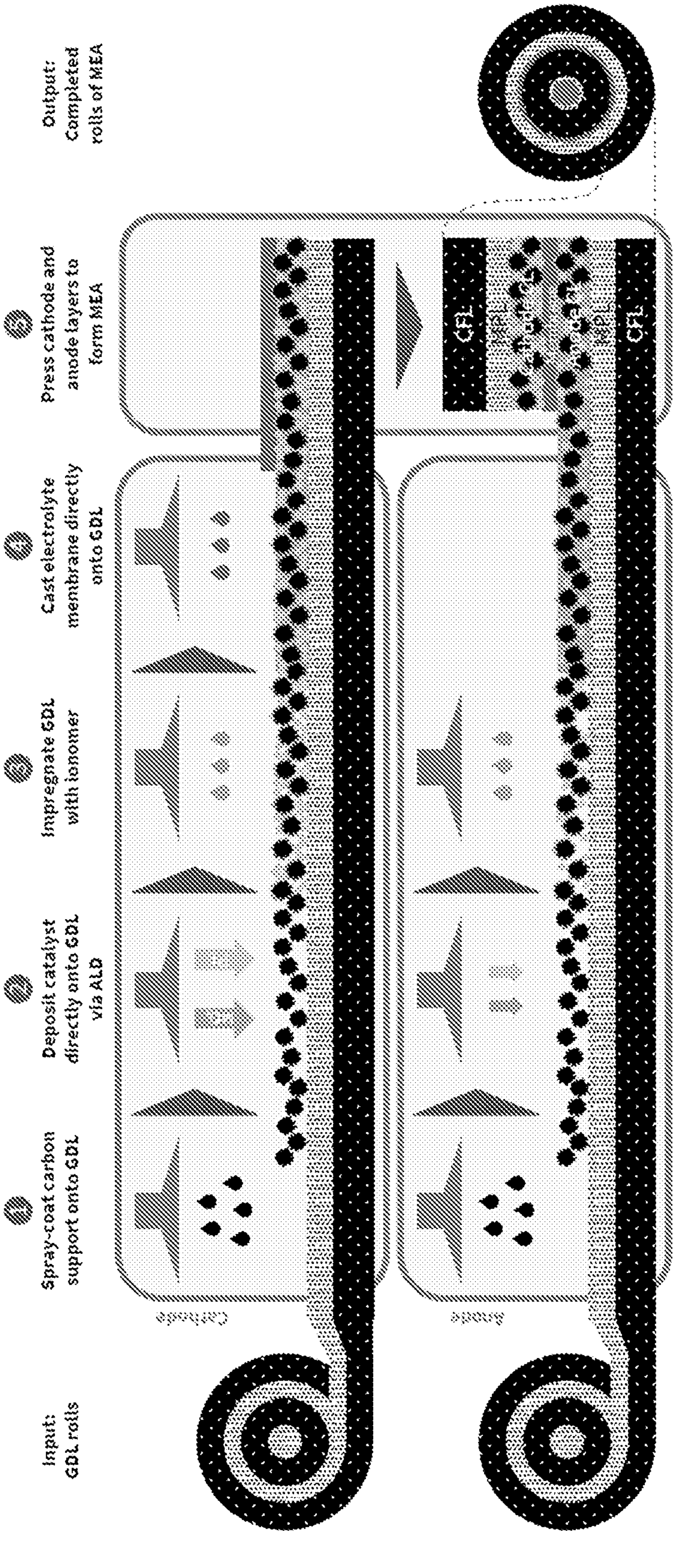
FIG. 13. Schematic process flow of an improved manufacturing process of a MEA.

FIG. 13 is a schematic process flow of an improved manufacturing process of a MEA, according to some embodiments. By way of overview, the improved process is a continuous, roll-to-roll process in which (1) highly nanostructured catalyst layers are formed on GDLs for both a cathode and an anode; after which (2) a polymer electrolyte membrane is formed on the catalyst layer for the cathode (or the anode) (e.g., by casting in a liquid form) to form an ultra-thin electrolyte membrane, after which (3) a resulting cathode layer and a resulting anode layer are assembled to form the MEA. Advantageously, the improved process allows attainment of a high performance of a catalyst by affording control over structures of the catalyst and its loading and attainment of low transport resistance of the ultra-thin electrolyte membrane, while also being scalable and modular for production at commercial scales.

Referring to stage 1 in FIG. 13, the process flow includes depositing a catalyst support on a GDL for a cathode, such as by spray-coating or another coating technique, to form a catalyst support-coated GDL for the cathode, and, in conjunction, the process flow includes depositing a catalyst support on a GDL for an anode, such as by spray-coating or another coating technique, to form a catalyst support-coated GDL for the anode.

Figure 14A:
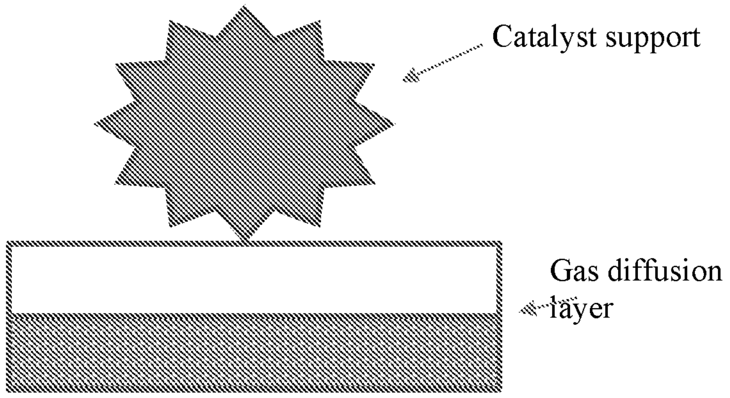
FIG. 14(*a*). Schematic of a porous catalyst support deposited on a GDL.
Figure 14B:
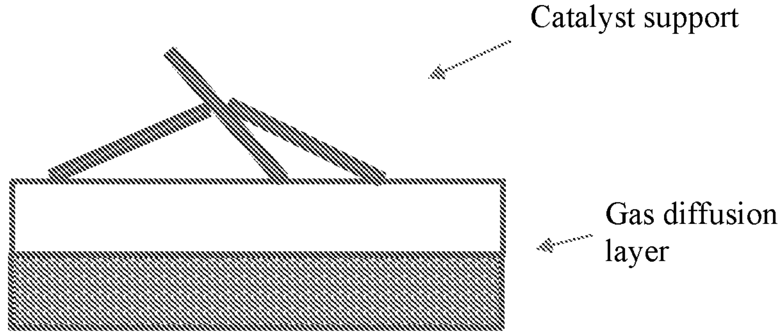

A catalyst support can be in the form of nanoparticles, such as carbonaceous nanoparticles having particle sizes in a range of about 5 nm to about 500 nm or more, such as from about 10 nm to about 400 nm, from about 10 nm to about 300 nm, from about 10 nm to about 200 nm, from about 10 nm to about 150 nm, or from about 10 nm to about 100 nm, and having aspect ratios of about 3 or less, or about 2 or less. Carbonaceous nanoparticles of a catalyst support can be porous, such that at least a fraction of a catalyst can be deposited within pores of the catalyst support (see FIG. 14(*a*)). Porous carbonaceous nanoparticles can include pores having pore diameters (or having a peak pore diameter) in a range of about 0.5 nm to about 12 nm, such as from about 1 nm to about 10 nm, from about 1 nm to about 8 nm, from about 2 nm to about 8 nm, from about 2 nm to about 6 nm, or from about 2 nm to about 5 nm. Other types of catalyst supports can be used, such as carbon nanohorns, carbon nanofibers, carbon nanoribbons, graphite, and graphene sheets, as well as non-carbon-based supports. For example, referring to FIG. 14(*b*), graphene sheets (monolayer, multilayer, or both) can be used as a catalyst support, and can be deposited in a randomly stacked manner to provide an enhanced surface area for deposition of a catalyst and yield an increased electrochemical active surface area of the deposited catalyst. Other surface area enhancing supports can be used in place of, or in conjunction with, graphene sheets. Catalyst supports deposited for the cathode and the anode in FIG. 13 can be the same or different (e.g., can differ in terms of one of more of particle size, pore diameter, porosity, and so forth).

A catalyst support can be dispersed in a catalyst support ink composition that also includes a solvent, one or more additives, and a binder, followed by a post-processing treatment, such as sintering, in which the solvent, the additives, and the binder are substantially removed. In the absence of a catalyst, there is greater flexibility in choosing solvents, dispersion agents, coating techniques, and post-processing treatments in depositing the catalyst support to form a catalyst support layer. The catalyst support layer can be designed and optimized according to specifications on surface area, ionomer incorporation, water management, and so forth, without compromising catalytic activity. As illustrated in FIG. 13, the GDLs for both the cathode and the anode each includes a carbonaceous fibrous layer, such as carbon cloth or carbon paper, which is covered by a microporous layer, and where a catalyst support is deposited on a surface of the microporous layer. At least a portion of either, or both, of the GDLs (e.g., the microporous layers) can be coated or otherwise treated with polytetrafluoroethylene (PTFE) in the form of a hydrophobic coating including PTFE. Other configurations of the GDLs can be implemented, such as where the microporous layers are omitted, or where PTFE treatment is omitted.

For either, or both, of the cathode and the anode, a gradient in a concentration or loading of a catalyst support can be attained within a resulting catalyst support layer along a direction from a GDL side to an opposite side proximal to an electrolyte membrane that is formed in a subsequent stage, by including a greater (or lesser) loading or concentration of the catalyst support at the GDL side compared to the opposite side. Such gradient—with a greater (or lesser) loading or concentration of the catalyst support at the GDL side descending (or ascending) to the opposite side—can be realized in the improved process by, for example, tuning a viscosity and a surface tension of an ink composition. Alternatively to, or in conjunction with, varying a concentration or loading of a catalyst support along a direction from a GDL side to an opposite side, a gradient can be implemented for the catalyst support in terms of type (e.g., form or type of the catalyst support can vary from the GDL side to the opposite side), sizes of the catalyst support (e.g., sizes of the catalyst support can vary from the GDL side to the opposite side), shapes of the catalyst support (e.g., shapes of the catalyst support can vary from the GDL side to the opposite side), pore diameter (e.g., pore diameter of the catalyst support can vary from the GDL side to the opposite side), porosity (e.g., porosity of the catalyst support can vary from the GDL side to the opposite side), and so forth.

Next, referring to stage 2 in FIG. 13, the process flow includes depositing a catalyst on the catalyst support layer for the cathode, thereby yielding a catalyst-coated GDL including a catalyst layer for the cathode, and, in conjunction, the process flow includes depositing a catalyst on the catalyst support layer for the anode, thereby yielding a catalyst-coated GDL including a catalyst layer for the anode. By depositing a catalyst subsequent to deposition of a catalyst support, the catalyst is not exposed or mixed with certain components of a catalyst support ink composition that can lower its catalytic activity, such as an alcohol used as a solvent in the ink composition.

A technique, which can conformally coat an enhanced surface area, such as chemical vapor deposition in the form of atomic layer deposition or another deposition technique, can be used for depositing a catalyst on a catalyst support layer. A catalyst can include a platinum group metal (PGM), such as Pt. In addition to Pt, deposition can be performed for other PGMs, such as ruthenium (Ru), rhodium (Rh), palladium (Pd), osmium (Os), and iridium (Ir), as well as other precious metals, such as silver (Ag) and gold (Au), as well as an alloy or other multi-element material including one or more of the foregoing.

In the case of atomic layer deposition, the deposition includes performing a first atomic layer deposition cycle to deposit a material of a catalyst on a catalyst support layer and a GDL held within a deposition chamber, followed by performing a second atomic layer deposition cycle to deposit the material on the catalyst support layer and the GDL, followed by performing a third atomic layer deposition cycle to deposit the material on the catalyst support layer and the GDL, and so on until a requisite amount of the material is deposited. A number of deposition cycles can be, for example, in a range from 1 to 5000, from 2 to 4000, from 3 to 3000, from 5 to 2000, or from 10 to 1000. Performing each atomic layer deposition cycle includes sequentially exposing the catalyst support layer and the GDL, to deposition gases including a first precursor containing the material to be deposited, and a second oxidative precursor. In the case of a single element metal, for example, the first precursor can be a metal-containing precursor such as an organometallic compound with a metal coordinated with organic ligands, and the second oxidative precursor can be oxygen, ozone, or oxygen plasma. For example, for the specific case of Pt, the first precursor can be trimethyl (methylcyclopentadienyl) platinum (IV) or another Pt-containing organometallic compound. In addition to Pt, deposition can be performed for other noble metals, as well as other single element metals. During the first atomic layer deposition cycle, the first precursor is introduced into the chamber to result in the first precursor being adsorbed to the catalyst support and the GDL, in the form of molecules of the first precursor, residues of the molecules of the first precursor, or a combination of both, and the second oxidative precursor is introduced into the chamber to result in a reaction between the adsorbed first precursor and the second oxidative precursor to liberate ligands included in the adsorbed first precursor, thereby leaving the material deposited on the catalyst support and the GDL. A second reductive precursor, such as hydrogen or hydrogen plasma, can be used in place of, or in combination with, the second oxidative precursor. A removal operation can be performed subsequent to introducing each precursor to remove reaction products and any unreacted precursor, such as by evacuation or purging with an inert carrier gas.

In some embodiments, the process flow includes—for either, or both, of the cathode and the anode—optionally functionalizing a catalyst support layer to yield a functionalized catalyst support layer, followed by deposition of a catalyst on the functionalized catalyst support layer. Functionalizing a catalyst support layer can be performed to introduce anchoring or reactive functional groups to a surface of the catalyst support layer, to enhance or promote chemical bonding with precursors of a catalyst to be deposited on the catalyst support layer. Functionalizing a catalyst support layer can be performed by applying a plasma treatment, such as hydrogen plasma, oxygen plasma, hydrogen sulfide plasma, or nitrogen plasma, and can result in the formation of, for example, hydrogen-containing anchoring groups (e.g., hydrogenation to introduce —C—H groups), oxygen-containing anchoring groups (e.g., groups containing a —C—O— moiety or a carbonyl moiety), sulfur-containing anchoring groups, nitrogen-containing anchoring groups, or a combination of such groups. In place of, or in combination with, a plasma treatment, functionalizing the substrate can be performed by wet chemical treatment, such as surface oxide etching followed by treatment by oxidizing acids (e.g., nitric acid) or treatment with ammonia, or using bases or other reactive compounds (e.g., reactive gases such as oxygen or ozone gas), or by thermal treatment.

In some embodiments, the process flow includes—for either, or both, of the cathode and the anode—optionally depositing a protection layer (or an adhesion layer or an under-layer) on a functionalized catalyst support layer to yield a protection layer-coated catalyst support layer, followed by deposition of a catalyst on the protection layer-coated catalyst support layer. A protection layer can protect an underlying catalyst support from oxidizing or corrosive environments under fuel cell operating conditions. A protection layer also can provide additional benefits, such as an increase in catalytic activity through strong metal support interaction (SMSI) (e.g., including one or more of structural (e.g., lattice strain), electronic (e.g., d-band center shift), and ligand effects), strong bonding to both a catalyst support and a catalyst to render enhanced stability to a catalyst layer, providing anchoring or reactive functional groups on a surface of the protection layer to enhance or promote chemical bonding with precursors of a catalyst to be deposited, and a faster growth rate of the catalyst on the protection layer. Examples of a material of a protection layer include metal or metalloid oxides (e.g., binary oxides, such as titanium oxide ($TiO_x$ such as $TiO_2$), cerium oxide ($CeO_x$), tungsten oxide ($WO_x$), and ternary, quaternary, or higher order oxides, with or without doping with dopants such as metals like niobium (Nb), tantalum (Ta), and so forth), metal or metalloid nitrides, metal or metalloid carbides, metal or metalloid borides, metal or metalloid sulfides, metal or metalloid phosphides, metal or metalloid silicides, other ceramics, or alloys or combinations of two or more of the foregoing. Depositing a protection layer can be performed by chemical vapor deposition and, in particular, atomic layer deposition, or another deposition technique. In the case of a metal or metalloid oxide, for example, performing each atomic layer deposition cycle includes sequentially exposing a functionalized catalyst support layer to deposition gases including a first precursor containing a metal or metalloid and a second oxidative precursor. For either, or both, of the cathode and the anode, a gradient in a concentration or loading of a material can be attained within a resulting protection layer along a direction from a GDL side to an opposite side proximal to an electrolyte membrane that is formed in a subsequent stage, by including a greater (or lesser) loading or concentration of the material of the protection layer at the GDL side compared to the opposite side. Such gradient—with a greater (or lesser) loading or concentration of the material at the GDL side descending (or ascending) to the opposite side—can be realized in the improved process by, for example, tuning deposition cycles in the case of atomic layer deposition. Alternatively to, or in conjunction with, varying a concentration or loading of a material of a protection layer along a direction from a GDL side to an opposite side, a gradient can be implemented for the material in terms of chemical composition (e.g., a chemical composition of the material can vary from the GDL side to the opposite side) or another characteristic. Differences in diffusivities of respective components or precursors of a protection layer can be leveraged to yield a gradient structure of the protection layer. Also, differences in accessibility of porous or layered structures (e.g., in a carbon support layer) can be leveraged to yield a gradient structure of the protection layer. For example, bulky components or precursors of a protection layer can be impeded from access to pores, while smaller components or precursors of the protection layer can access and can penetrate into the pores. A gradient structure also can be attained by control over temperature, time duration, electric field, pressure, concentrations of components or precursors, and type or amount of solvents or carrier gases.

In some embodiments, the process flow omits—for either, or both, of the cathode and the anode—deposition of a catalyst support, and where deposition of a catalyst is performed on a microporous layer of a GDL in the absence of a catalyst support layer. The process flow includes optionally functionalizing a microporous layer to yield a functionalized microporous layer, followed by deposition of a catalyst on the functionalized microporous layer. Functionalizing a microporous layer can be performed in a similar manner as explained above with regard to functionalizing a catalyst support layer. The process flow includes optionally depositing a protection layer (or an adhesion layer or an under-layer) on a functionalized microporous layer to yield a protection layer-coated microporous layer, followed by deposition of a catalyst on the protection layer-coated microporous layer. Deposition of a protection layer can be performed in a similar manner as explained above with regard to a protection layer-coated catalyst support layer.

Figure 15A:
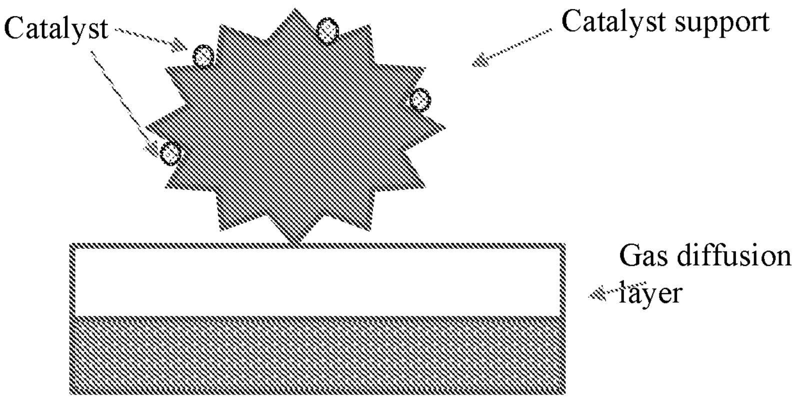
FIG. 15(*a*). Schematic of deposits of a catalyst on a porous catalyst support deposited on a GDL.
Figure 15B:
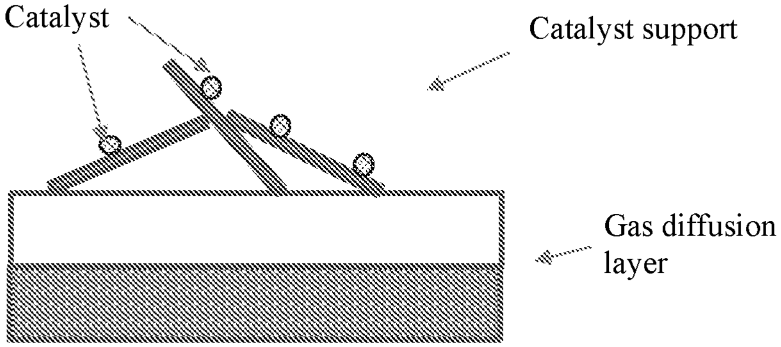
Figure 15C:
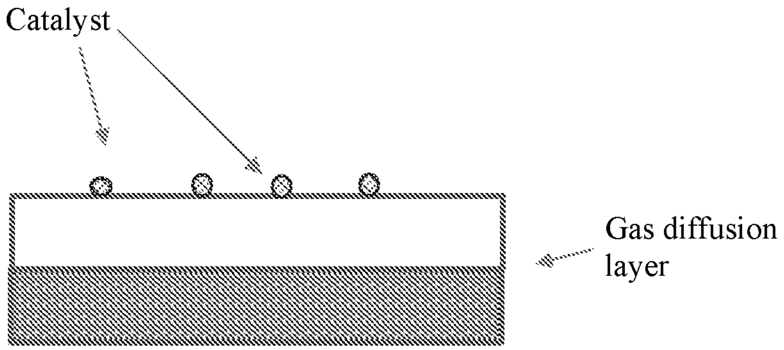

Deposits of a catalyst can be in the form of nanoparticles having particle sizes (or having a peak particle size) in a range of about 0.5 nm to about 20 nm or less, such as from about 0.5 nm to about 15 nm, from about 0.5 nm to about 10 nm, from about 0.5 nm to about 8 nm, from about 0.5 nm to about 5 nm, from about 0.5 nm to about 4 nm, from about 0.5 nm to about 3 nm, or from about 0.5 nm to about 2 nm. At least a fraction of catalyst nanoparticles can be deposited within pores of a catalyst support (see FIG. 15(*a*)). Referring to FIG. 15(*b*), catalyst nanoparticles can be deposited on an enhanced surface area provided by randomly stacked graphene sheets used as a catalyst support. Deposits of a catalyst can have similar characteristics when deposited on a GDL in the absence of a catalyst support (see FIG. 15(*c*)).

Catalysts deposited for the cathode and the anode in FIG. 13 can be the same or different (e.g., can differ in terms of one of more of chemical composition, sizes of deposits, shapes of deposits, loading, and so forth), thereby allowing respective optimization of the catalysts for oxygen reduction reaction (ORR) at the cathode and hydrogen oxidation reaction (HOR) at the anode. For example, a loading of the catalyst in the anode can be reduced or lowered compared to a loading of the catalyst in the cathode, given a high diffusivity of hydrogen gas and more favorable reaction kinetics at the anode compared to the cathode.

For either, or both, of the cathode and the anode, a gradient in a concentration or loading of a catalyst can be attained within a resulting catalyst layer along a direction from a GDL side to an opposite side proximal to an electrolyte membrane that is formed in a subsequent stage, by including a greater (or lesser) loading or concentration of the catalyst at the GDL side compared to the opposite side. Such catalyst gradient—with a greater (or lesser) loading or concentration at the GDL side descending (or ascending) to the opposite side—can be realized in the improved process by, for example, tuning deposition cycles in the case of atomic layer deposition. Alternatively to, or in conjunction with, varying a concentration or loading of a catalyst along a direction from a GDL side to an opposite side, a gradient can be implemented for the catalyst in terms of one of more of chemical composition (e.g., a chemical composition of the catalyst can vary from the GDL side to the opposite side), sizes of deposits of the catalyst (e.g., sizes of the deposits can vary from the GDL side to the opposite side), shapes of deposits of the catalyst (e.g., shapes of the deposits can vary from the GDL side to the opposite side), and so forth. Differences in diffusivities of respective components or precursors of a catalyst can be leveraged to yield a gradient structure of the catalyst. Also, differences in accessibility of porous or layered structures (e.g., in a carbon support layer) can be leveraged to yield a gradient structure of the catalyst. For example, bulky components or precursors of a catalyst can be impeded from access to pores, while smaller components or precursors of the catalyst can access and can penetrate into the pores. A gradient structure also can be attained by control over temperature, time duration, electric field, pressure, concentrations of components or precursors, and type or amount of solvents or carrier gases.

Next, referring to stage 3 in FIG. 13, the process flow includes depositing an ionomer on the catalyst layer of the catalyst-coated GDL for the cathode, such as by drop casting or another coating technique, or by molecular layer deposition, to at least partially impregnate the ionomer into the catalyst layer and form an ionomer-coated GDL as a gas diffusion electrode (GDE) for the cathode, and, in conjunction, the process flow includes depositing an ionomer on the catalyst layer of the catalyst-coated GDL for the anode, such by drop casting or another coating technique, to at least partially impregnate the ionomer into the catalyst layer and form an ionomer-coated GDL as a GDE for the anode. By depositing and impregnating an ionomer subsequent to deposition of a catalyst and deposition of a catalyst support, the improved process provides an ability to optimize or otherwise tune a solvent composition used for depositing the ionomer and to optimize or otherwise tune a catalyst-ionomer interface to maintain enhanced catalytic activity while imparting enhanced proton transport. An example of the ionomer is a sulfonated tetrafluoroethylene-based fluoropolymer, such as Nafion.

Figure 16A:
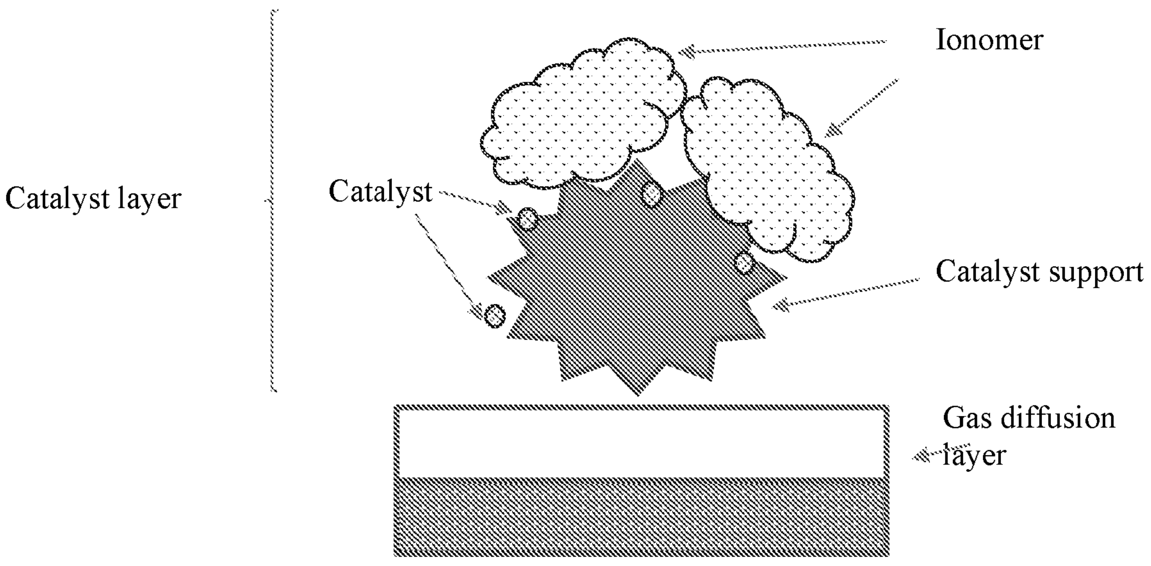
FIG. 16(*a*). Schematic of a catalyst layer on a GDL.
Figure 16B:
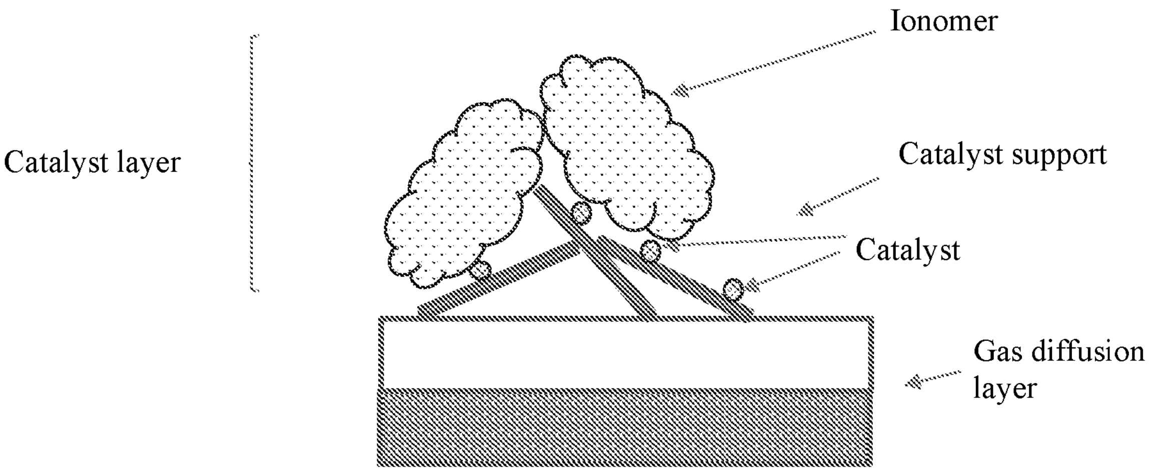

Referring to FIG. 16(*a*) and FIG. 16(*b*), a catalyst layer has one surface disposed adjacent to a microporous layer of a GDL and an opposite surface disposed adjacent to an electrolyte membrane that is formed in a subsequent stage. From a proton conductivity standpoint, a greater concentration of an ionomer can benefit proton transport. Nevertheless, gas mass transport impedance in the ionomer also should be considered. In the case of a cathode, for example, oxygen, in most cases, diffuses from a GDL to reach catalytic surfaces. With this respect, a lesser concentration of the ionomer is desirable. Also, direct contact between the ionomer and catalyst nanoparticles can reduce catalytic activity of the catalyst nanoparticles. In the improved process, optimization of a balance between these effects can be achieved with a gradient in a concentration or loading of an ionomer along a direction from an electrolyte membrane side to a GDL side, by including a greater loading or concentration of the ionomer at the electrolyte membrane side compared to the GDL side. In the case of a cathode, for example, proton transports from the electrolyte membrane side to the GDL side. The criterion of proton conductivity is lesser on the GDL side compared to the electrolyte membrane side. Gas (e.g., oxygen) diffuses from the GDL side to the electrolyte membrane side, so a lower loading or concentration of the ionomer at the GDL side benefits gas diffusion, enhances gas utilization, and reduces direct contact between the ionomer and catalyst nanoparticles. At least a fraction of the catalyst nanoparticles can be deposited within pores of a catalyst support, to further reduce direct contact between the ionomer and catalyst nanoparticles (see FIG. 16(*a*)). Such ionomer gradient with a greater loading or concentration at the electrolyte membrane side descending to the GDL side suits both proton conductivity and gas transport impedance, while maintaining catalytic activity. This gradient profile in concentration can be realized in the improved process where the ionomer is impregnated after deposition of the catalyst, and the gradient can be tuned by, for example, a viscosity and a surface tension of a solution of the ionomer. For example, a concentration or loading of the ionomer adjacent to a first interface between the catalyst layer and the electrolyte membrane can be a first concentration or loading, a concentration or loading of the ionomer adjacent to a second interface between the catalyst layer and the GDL can be a second concentration or density, and a concentration or loading of the ionomer at a position halfway between the first interface and the second interface can be a third concentration or density, where the first concentration is greater (e.g., at least about 1.1 times greater, at least about 1.3 times greater, or at least about 1.5 times greater) than the second concentration, the first concentration is greater (e.g., at least about 1.05 times greater, at least about 1.1 times greater, or at least about 1.2 times greater) than the third concentration, and the third concentration is greater than the second concentration (e.g., at least about 1.05 times greater, at least about 1.1 times greater, or at least about 1.2 times greater). More generally, a concentration or loading of an ionomer can vary according to an ionomer gradient with a greater (or a lesser) concentration on an electrolyte membrane side descending (or ascending) to a GDL side, or can vary according to another gradient profile. Alternatively to, or in conjunction with, varying a concentration or loading of an ionomer along a direction from an electrolyte membrane side to a GDL side, a gradient can be implemented for the ionomer in terms of one of more of chemical composition (e.g., a chemical composition of the ionomer can vary from the electrolyte membrane side to the GDL side), molecular weight (e.g., a molecular weight of the ionomer can vary from the electrolyte membrane side to the GDL side), and so forth. For example, a gradient in molecular weight (e.g., varying chain lengths) can be implemented for an ionomer via molecular layer deposition. Differences in diffusivities of respective components or precursors of an ionomer can be leveraged to yield a gradient structure of the ionomer. Also, differences in accessibility of porous or layered structures (e.g., in a carbon support layer) can be leveraged to yield a gradient structure of the ionomer. For example, bulky components or precursors of an ionomer can be impeded from access to pores, while smaller components or precursors of the ionomer can access and can penetrate into the pores. A gradient structure also can be attained by control over temperature, time duration, electric field, pressure, concentrations of components or precursors, and type or amount of solvents or carrier gases.

Referring to FIG. 16(*a*) and FIG. 16(*b*), deposits of an ionomer can be in the form of agglomerates having sizes (or having a peak size) in a range of about 20 nm to about 10,000 nm, such as from about 50 nm to about 5,000 nm, from about 50 nm to about 1,000 nm, from about 50 nm to about 500 nm, or from about 100 nm to about 500 nm. By taking the form of agglomerates, reduced contact or exposure of catalyst nanoparticles (e.g., deposited within pores of a catalyst support) to the ionomer can be attained. Sizes of agglomerates of an ionomer can be tuned by varying a solvent composition (e.g., a ratio of water to alcohol) used for depositing the ionomer.

Ionomers deposited for the cathode and the anode in FIG. 13 can be the same or different (e.g., can differ in terms of one of more of chemical composition, sizes of agglomerates, shapes of agglomerates, loading, and so forth), thereby allowing respective optimization for ORR at the cathode and HOR at the anode. For example, a loading of the ionomer in the anode can be increased compared to a loading of the ionomer in the cathode, given a high diffusivity of hydrogen gas and more favorable reaction kinetics at the anode compared to the cathode.

Next, referring to stage 4 in FIG. 13, the process flow includes depositing an ionomer on the GDE for the cathode, such as by drop casting or another coating technique, to form an electrolyte membrane on the GDE for the cathode. Although formation of an electrolyte membrane is shown and explained with regard to the cathode in FIG. 13, formation of an electrolyte membrane can be alternatively, or in conjunction, performed on the GDE for the anode. By forming an electrolyte membrane on a catalyst layer instead of laminating a pre-formed electrolyte membrane, the improved process provides an ability to optimize or otherwise tune a thickness and a chemical composition of the electrolyte membrane to attain low transport resistance. For example, a thickness of the electrolyte membrane can be reduced to about 18 μm or less, about 15 μm or less, about 13 μm or less, about 10 μm or less, or about 8 μm or less, and down to about 5 μm or less. Also, strengthening additives—as included in a pre-formed electrolyte membrane and which can compromise proton conductivity—can be omitted, thereby further promoting low transport resistance. An example of the ionomer is a sulfonated tetrafluoroethylene-based fluoropolymer, such as Nafion.

By forming an electrolyte membrane on a catalyst layer, a gradient in a concentration or loading of an ionomer can be attained within the resulting electrolyte membrane along a direction from a cathode side to an anode side, by including a greater (or lesser) loading or concentration of the ionomer at the cathode side compared to the anode side. Such ionomer gradient—with a greater (or lesser) loading or concentration at the cathode side descending (or ascending) to the anode side—can be realized in the improved process by, for example, tuning a viscosity and a surface tension of a solution of the ionomer. Alternatively to, or in conjunction with, varying a concentration or loading of an ionomer along a direction from a cathode side to an anode side, a gradient can be implemented for the ionomer in terms of one of more of chemical composition (e.g., a chemical composition of the ionomer can vary from the cathode side to the anode side), molecular weight (e.g., a molecular weight of the ionomer can vary from the cathode side to the anode side), and so forth. For example, a gradient in molecular weight (e.g., varying chain lengths) can be implemented for an ionomer via molecular layer deposition. Deposits of an ionomer can be in the form of agglomerates, and sizes of agglomerates of the ionomer can be tuned by varying a solvent composition (e.g., a ratio of water to alcohol) used for depositing the ionomer.

An ionomer deposited to form the electrolyte membrane in FIG. 13 can be the same as or different from ionomers deposited for the cathode and the anode (e.g., can differ in terms of one of more of chemical composition, sizes of deposits, shapes of deposits, loading, and so forth). For example, a loading of an ionomer in the electrolyte membrane can be increased compared to a loading of an ionomer in the cathode.

Figure 17:
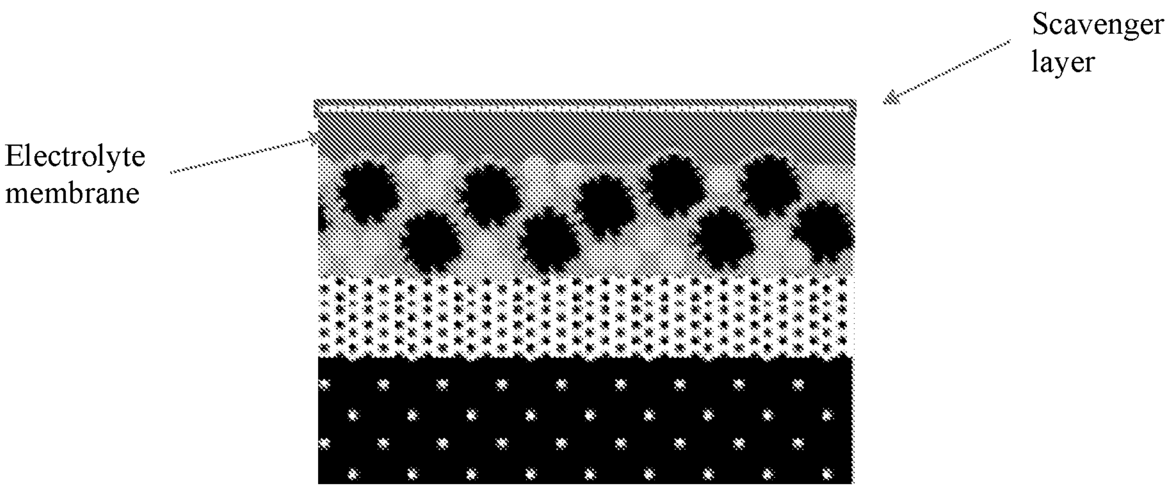
FIG. 17. Schematic of a scavenger layer on a GDL.

In some embodiments and referring to FIG. 17, the process flow includes optionally depositing a radical scavenger to form a scavenger layer on the electrolyte membrane. Although formation of a scavenger layer is shown and explained as being performed after formation of the electrolyte membrane in FIG. 17, formation of a scavenger layer can be alternatively, or in conjunction, performed prior to formation of the electrolyte membrane; namely, the scavenger layer can be formed on a catalyst layer, followed by formation of the electrolyte membrane on the scavenger layer. A scavenger layer can protect an electrolyte membrane from radicals under fuel cell operating conditions, which can degrade the electrolyte membrane. Examples of radical scavengers include metal oxides (e.g., binary oxides, such as cerium oxide ($CeO_x$), chromium oxide ($CrO_x$), and ternary, quaternary, or higher order oxides, with or without doping with dopants such as metals like zirconium (Zr)), other elemental or non-elemental radical scavengers, or combinations of two or more of the foregoing. Depositing a scavenger layer can be performed by chemical vapor deposition and, in particular, atomic layer deposition, or another deposition technique. A gradient in a concentration or loading of a radical scavenger can be attained within the resulting scavenger layer along a direction proximal to an electrolyte membrane and extending away from the electrolyte membrane, by including a greater loading or concentration of the radical scavenger at an electrolyte membrane side compared to an opposite side away from the electrolyte membrane. Alternatively to, or in conjunction with, varying a concentration or loading of a radical scavenger, a gradient can be implemented for the radical scavenger in terms of chemical composition (e.g., a chemical composition of the radical scavenger can vary from the electrolyte membrane side to the opposite side) or another characteristic.

Figure 18:
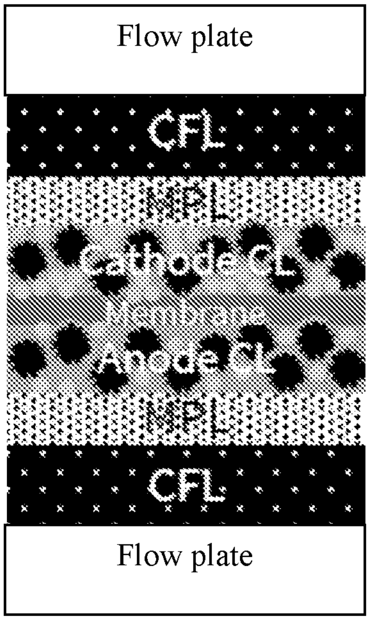
FIG. 18. Schematic of a PEMFC including a MEA between a pair of flow plates.

Next, referring to stage 5 in FIG. 13, the process flow includes pressing or laminating the electrolyte membrane and the GDE for the cathode with the GDE for the anode, thereby forming a MEA. The resulting MEA can be assembled between a pair of flow plates to result in a PEMFC (see FIG. 18).

Figure 19:
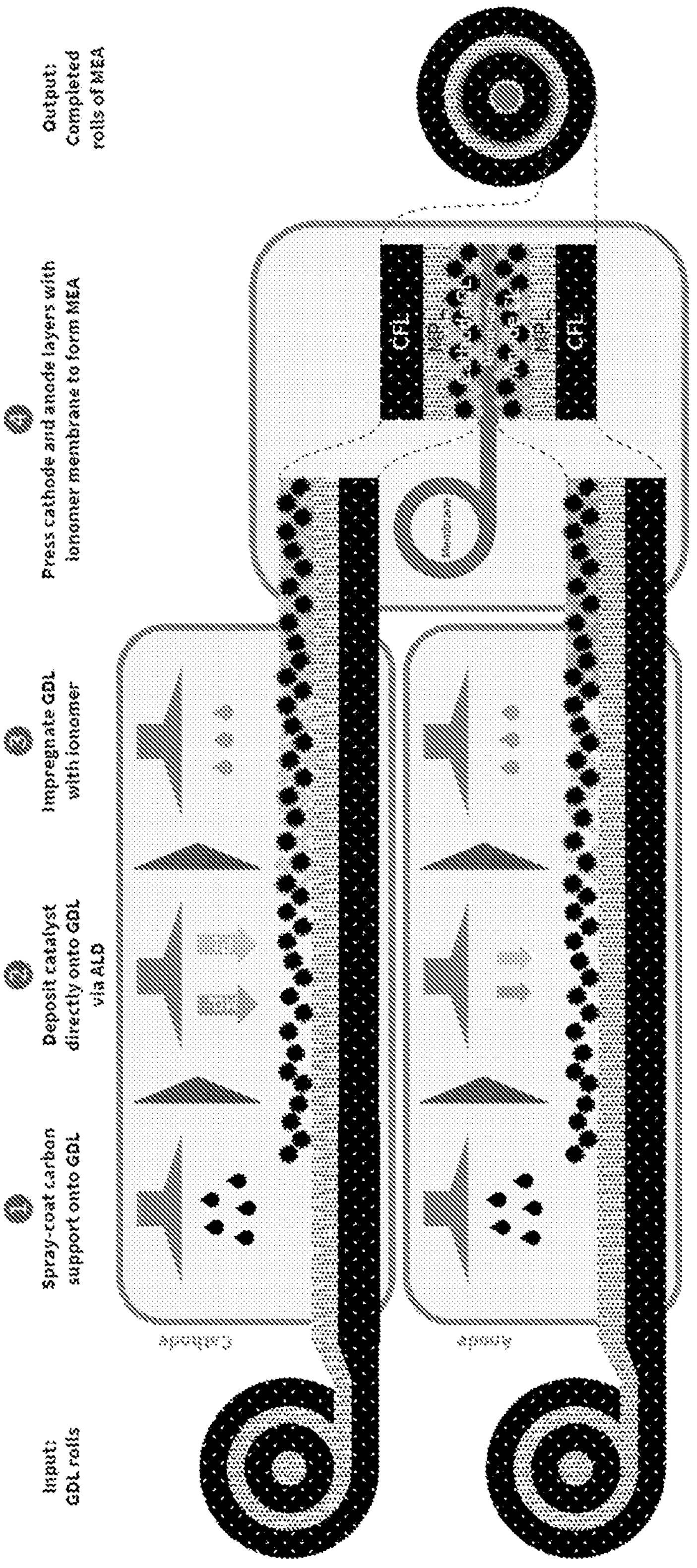
FIG. 19. Schematic process flow of another manufacturing process of a MEA.

FIG. 19 is a schematic process flow of a manufacturing process of a MEA, according to additional embodiments. Stages 1 through 3 of the process flow in FIG. 19 can be similarly performed as explained above with regard to FIG. 13, and repeated explanation is omitted. Referring to stage 4 in FIG. 19, the process flow includes pressing or laminating a pre-formed electrolyte membrane with a GDE for a cathode and a GDE for an anode, thereby forming a MEA. The resulting MEA can be assembled between a pair of flow plates to result in a PEMFC.

Figure 20:
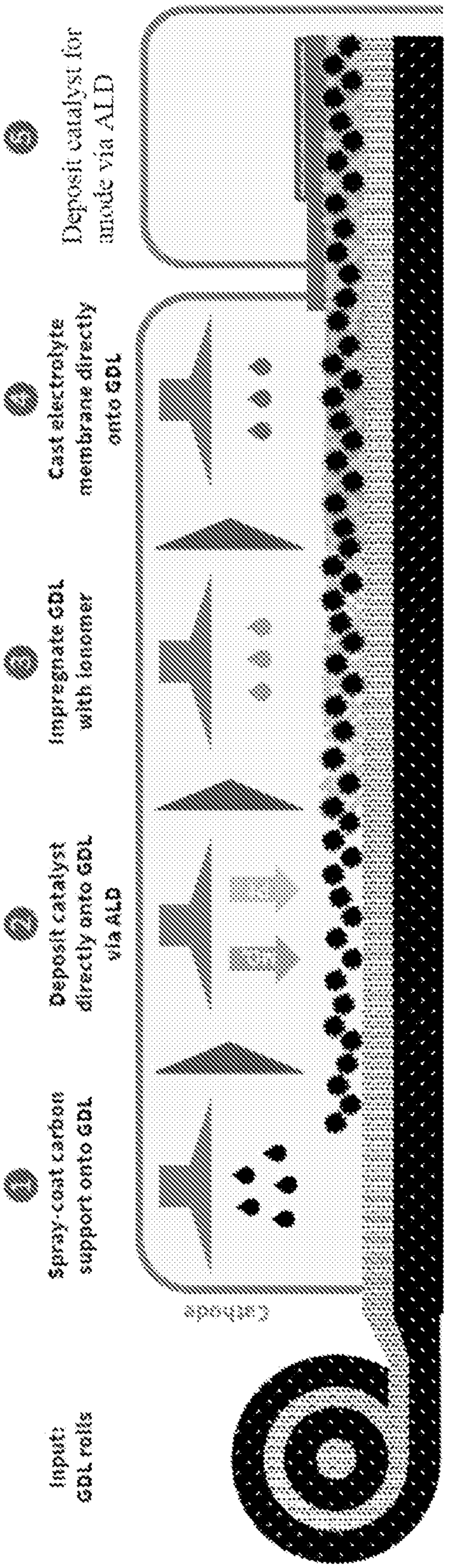
FIG. 20. Schematic process flow of a further manufacturing process of a MEA.

FIG. 20 is a schematic process flow of a manufacturing process of a MEA, according to further embodiments. With regard to a cathode, stages 1 through 4 of the process flow in FIG. 20 can be similarly performed as explained above with regard to FIG. 13, and repeated explanation is omitted. Referring to stage 5 in FIG. 20, the process flow includes depositing a catalyst for an anode on an electrolyte membrane—which is formed on a GDE for the cathode—thereby yielding a catalyst-coated GDE including a catalyst layer for the anode. The process flow of FIG. 20 allows for respective optimization of catalysts for ORR at the cathode and HOR at the anode, as well as imparting the anode with resistance to carbon monoxide. For example, a loading of a catalyst in the anode can be reduced or lowered compared to a loading of a catalyst in the cathode, or the catalysts can be differ in terms of one of more of chemical composition, sizes of deposits, shapes of deposits, loading, and so forth. Also, a gradient can be implemented for a catalyst deposited for the anode in terms of one of more of chemical composition (e.g., a chemical composition of the catalyst can vary from an electrolyte membrane side to an opposite side), sizes of deposits of the catalyst (e.g., sizes of the deposits can vary from the electrolyte membrane side to the opposite side), shapes of deposits of the catalyst (e.g., shapes of the deposits can vary from the electrolyte membrane side to the opposite side), and so forth.

Figure 21:
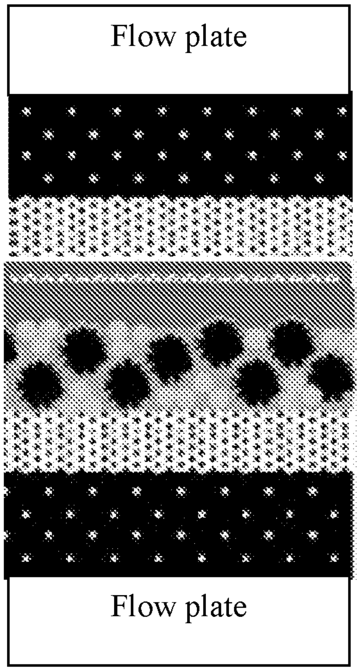
FIG. 21. Schematic of another PEMFC including a MEA between a pair of flow plates.

The resulting intermediate structure in FIG. 20 can be pressed or laminated with another GDE, thereby forming a MEA. The resulting MEA can be assembled between a pair of flow plates to result in a PEMFC (see FIG. 21).

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Bottom-up fabrication of low-platinum-loaded atomic layer deposited cathodes for high-power proton exchange membrane fuel cells Overview As the platinum (Pt) loading in proton exchange membrane fuel cell cathodes is driven down to reduce costs, catalyst utilization becomes increasingly important. Here, this example reports an atomic layer deposition (ALD)-facilitated electrode fabrication technique designed to engineer a catalyst-ionomer interface. By casting the ionomer separately from the Pt catalyst and carbon support, gain is made of the ability to vary the ionomer solvent environment and carbon pore structure independently. Ultimately, it is found that a combination of an agglomerated ionomer dispersion with a mesoporous carbon support gave access to a high catalytic activity (mass activity (MA)=about 0.31 A/$mg_{Pt}$ with pure Pt) that could be retained into the high current density regime. It is hypothesized that the formulation results in Pt sufficiently withdrawn from the ionomer such that poisoning and transport losses are reduced. When paired with a low-resistance dispersion-cast membrane, cathodes delivered a power density of about 1.3 W/$cm^2$ at standard conditions, about 30% greater than the Department of Energy target rated power.

Introduction

Affording fast refueling and long ranges, hydrogen-powered proton exchange membrane fuel cells (PEMFC) are emerging alongside batteries as a reduced-emission alternative to internal combustion engines (ICE) for transportation applications. To lower costs and afford deep market penetration of PEMFC vehicles, automotive manufacturers are interested in decreasing the quantity of Pt in electrodes. For reference to the incumbent technology, ICE vehicles also employ scarce and expensive Pt-group metals (PGMs) in catalytic converters but just use about 2-8 g compared to about 30+ g in latest fuel cell vehicles. Aligned with the aims of automotive manufacturers, the U.S. Department of Energy (DOE) has set a total areal loading target of 0.125 $mg_{PGM}/cm^2$, corresponding to about 11.3 $g_{PGM}$ for a mid-sized, 90 $kW_{gross}$ vehicle.

Because of the high diffusivity of $H_2$ and the rapid hydrogen oxidation kinetics on Pt catalysts, anode loadings as low as about 0.025 $mg_{Pt}/cm^2$ can be used in PEMFCs without considerable voltage loss. This leaves a target of less than about 0.1 $mg_{Pt}/cm^2$ for a cathode to achieve the rated power density of 1 W/$cm^2$ at a reasonable cell efficiency. Due to the sluggish oxygen reduction reaction (ORR) kinetics and relatively low diffusivity of $O_2$, this presents a major challenge. To improve ORR kinetics, efforts are devoted into improving the dispersion and intrinsic activity of Pt, largely through alloying and nanostructuring. Although order-of-magnitude improvements are made in mass-normalized activity relative to Pt in a rotating disk electrode configuration, translating these improvements into more industrially relevant membrane electrode assemblies (MEAs) has remained a challenge. Furthermore, while the theoretical voltage loss for reducing a cathode loading from about 0.3 $mg_{Pt}/cm^2$ to about 0.1 $mg_{Pt}/cm^2$ is about 33 mV for a given Pt catalyst, additional voltage losses are observed at high current densities due to a heightened flux of $O_2$ at a Pt surface. These transport-related losses are independent of intrinsic catalyst activity and can exceed about 100 mV for low-loaded cathodes at high current densities.

To mitigate these transport losses as well as improve catalyst activity, efforts are devoted to engineering a Pt-ionomer interface. The ionomer—while functioning for delivering protons to a Pt surface—impedes $O_2$ transport and can act as a catalyst poison. For this reason, reducing the exposure of Pt to the ionomer while maintaining proton accessibility is desired for PEMFC performance. In a comparative fabrication of an MEA, Pt synthesized on a carbon support is mixed with an ionomer dispersion to form an ink that is subsequently cast onto either a membrane or gas diffusion media. Characterizing the Pt-ionomer interface that results from this preparation is difficult, but analyses show that the interface may be sensitive to parameters such as Pt synthesis technique, ionomer molecular structure, dispersant/solvent composition, ink dispersion technique, carbon surface functionalization, and carbon pore size distribution.

Despite strong results achieved through optimization within this comparative fabrication framework, it is important to identify alternative preparation routes that may be subject to different practical constraints. For example, in the comparative ink-based architecture, certain solvent compositions and sonication/stirring procedures are performed to properly disperse solids for film application. Here, this example introduces an MEA fabrication technique facilitated by ALD where carbon, Pt, and ionomer are deposited sequentially. Unconstrained by the criterion to disperse an ink, tuning can be made of an ionomer solvent environment independently of the Pt/C microstructure. In evaluating a series of ionomer dispersion alcohol contents and carbon supports, it is found that a combination of agglomerated ionomer dispersions and mesoporous furnace carbons yielded remarkably active cathodes at both low and high current densities. When used in conjunction with a low-resistance dispersion-cast membrane, unprecedented power densities of about 1.3 W/$cm^2$ and about 1.6 W/$cm^2$ could be obtained in air at about 150 kPa and about 230 kPa backpressures, respectively.

Electrode Fabrication and Characterization

Figure 1:
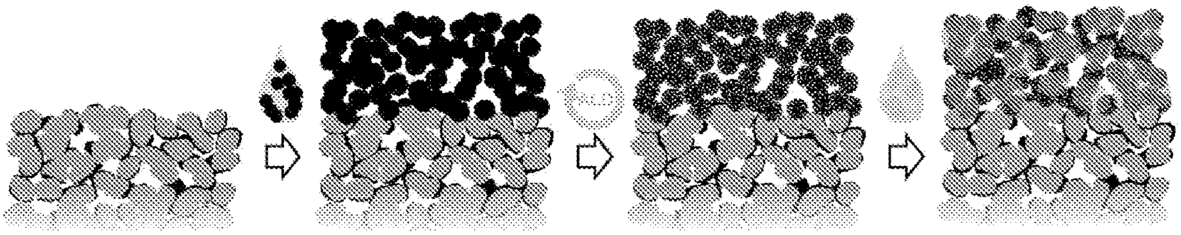
FIG. 1. Schematic illustration of a bottom-up electrode fabrication procedure in which carbon, platinum (Pt) nanoparticles, and ionomer are deposited sequentially on a polytetrafluoroethylene (PTFE)-treated microporous layer of a gas diffusion layer.

In a proposed bottom-up electrode fabrication (depicted in FIG. 1), an about 2-5 μm layer of carbon support is first deposited onto a microporous layer of a gas diffusion layer via filtration. Pt is then grown on the layer of carbon support using thirty cycles of a CO-passivated ALD (PALD). While in principle this fabrication technique does not necessitate ALD-prepared Pt, it may be otherwise difficult to prepare a thin Pt/C layer without introducing an ionomer as a dispersing agent. Furthermore, PALD Pt can deliver heightened activity and durability due to a flattened geometry and uniform size of resulting Pt particles. To impregnate the resulting catalyst layer, an ionomer dispersion is drop cast onto the surface. For evaluating the effects of ionomer dispersant and carbon support, cathodes were assembled with commercial about 0.1 $mg_{Pt}/cm^2$ anode-coated membranes for testing. As discussed later, a cast membrane was prepared for power density measurements. The ALD-prepared MEA was conditioned and tested under differential flow at about 80° C., about 100% relative humidity (RH), and about 150 kPa backpressure, unless otherwise noted.

The Methods section further details electrode fabrication and the fuel cell testing protocol.

A goal of this example was to assess the catalytic performance of cathodes across a large span in current density. A metric used for ORR kinetics in PEMFCs is a mass-normalized current at an iR-corrected cell potential of about 0.9V. Because transport-related losses at this cell potential are negligible, this mass activity or MA is used to describe the kinetics of ORR in a cathode. However, current densities relevant to high-power fuel cell operation are about two orders of magnitude greater than those measured for the MA. At these current densities, voltage losses after ohmic and concentration corrections can be observed which cannot be accounted for by streamlined (fixed slope) Tafel kinetics. These losses are not well understood but may be explained by a change in Tafel slope or the inadequacy of determining concentration losses with limiting current measurements. To quantify these unexplained losses, specification is made of Pt utilization ($U_{Pt}$) as a $H_2$ crossover-corrected current density ($i_{eff}$) at an ohmic- and concentration-corrected cell potential of about 0.75V normalized by the current density projected from about 0.85V assuming streamlined Tafel kinetics (Eq. 1).

$$U_{Pt}(\%) = \frac{i_{0.75V}}{i_{0.75V,Tafel}} \times 100\% \quad (1)$$

Because the kinetic current density at about 0.75V is about 27 times greater than at about 0.85V under this assumption, $U_{Pt}$ describes unexplained losses that evolve from a low current density (LCD) regime to a high current density (HCD) regime. Therefore, while MA specifies the LCD performance of the Pt-ionomer catalytic environment, $U_{Pt}$ specifies the HCD performance. Also included is a total $O_2$ transport resistance in assessing HCD performance but it is noted that the value is loading dependent and tends to correlate with $U_{Pt}$.

Ionomer Dispersant Effect

Figure 2:
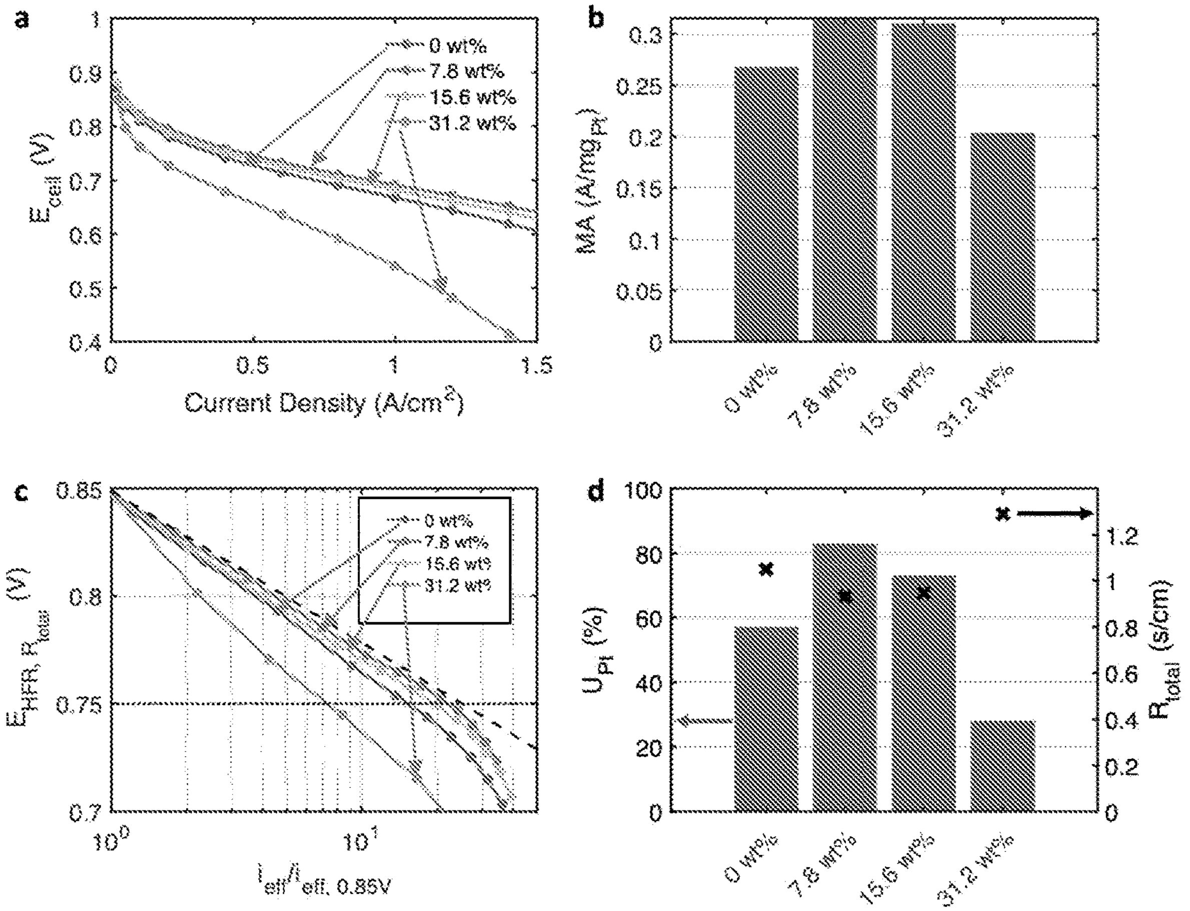
FIG. 2. Effect of ionomer dispersion alcohol content on fuel cell performance. a, Uncorrected MEA $H_2$-air polarization curves. b, MEA $H_2$—$O_2$ mass activity (MA) values for cathodes prepared with ionomer dispersions containing different alcohol concentrations. c, MEA $H_2$-air polarization curves with potentials corrected for high frequency resistance (HFR) and total oxygen transport resistance ($R_{total}$) and current densities corrected for $H_2$ crossover ($i_{eff}$) and normalized by a value at about 0.85V. The dashed line represents a theoretical curve following streamlined Tafel kinetics. d, Platinum utilization ($U_{Pt}$) values extracted from c (left) and $R_{total}$ values (right). Conditions: cathode loading=0.095±0.015 $mg_{Pt}/cm^2$; anode loading=about 0.1 $mg_{Pt}/cm^2$; cell temperature=about 80° C.; total outlet pressures=about 150 kPa; cathode and anode relative humidity (RH)=about 100%; cathode flow rate=about 5000 standard cubic centimeters per minute (sccm); anode flow rate=about 500 sccm.

To assess the effect of ionomer dispersant composition on MEA performance, about 0.5 wt. % aqueous Nafion formulations with different alcohol content—0, about 7.8, about 15.6, and about 31.2 wt. %—were used to impregnate catalyst layers prepared with PALD Pt and a porous carbon black (CB-KB discussed later). Cathodes with loadings of 0.095±0.015 $mg_{Pt}/cm^2$ were fabricated in this manner and MEA was tested under the aforementioned conditions. FIG. 2*a* displays uncorrected polarization curves corresponding to each ionomer dispersion. Evidently, the 0 wt. % alcohol sample trails slightly behind the intermediate about 7.8 and about 15.6 wt. % samples while the about 31.2 wt. % sample performs significantly worse. LCD and HCD performances are formalized in FIGS. 2*b* and 2*d*. MA (FIG. 2*b*) reaches a respectable about 0.31 $A/mg_{Pt}$ for the intermediate about 7.8 and about 15.6 wt. % alcohol samples, followed by about 0.27 and about 0.20 for the 0 and about 31.2 wt. % samples, respectively. $U_{Pt}$ values displayed in FIG. 2*d* were extracted from corrected and normalized polarization curves (FIG. 2*c*). With a $U_{Pt}$ of about 83%, the about 7.8 wt. % sample retained a significant portion of its LCD catalytic performance in the HCD regime; the about 15.6 wt. %, 0 wt. %, and about 31.2 wt. % samples followed in that order. The total transport resistances ($R_{total}$) (FIG. 2*c*) qualitatively map inversely onto the $U_{Pt}$ values for the data set.

Figure 3:
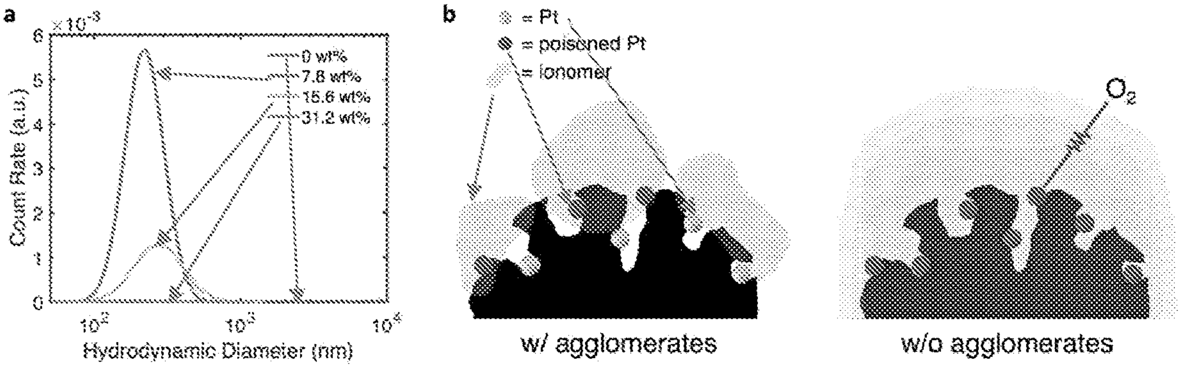
FIG. 3. Physical characterization of ionomer dispersions. a, Dynamic light scattering measurements for about 0.5 wt. % ionomer dispersions containing different alcohol concentrations. b, Illustration of hypothesized catalyst structures formed with agglomerated and non-agglomerated ionomer dispersions.
Figure 7:
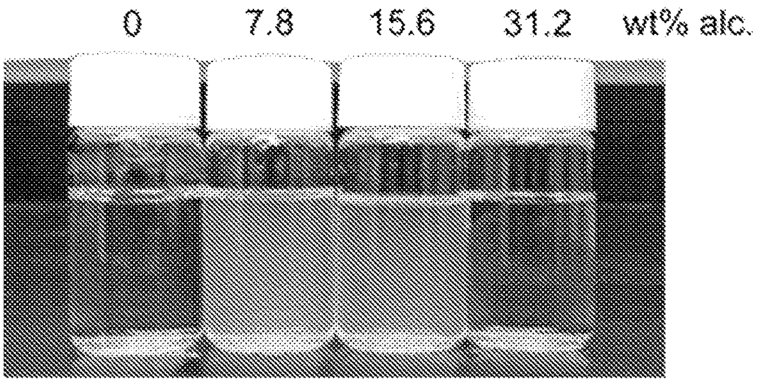
FIG. 7. Vials containing four about 0.5 wt. % Nafion dispersions with various alcohol contents and balance water.
Figure 8:
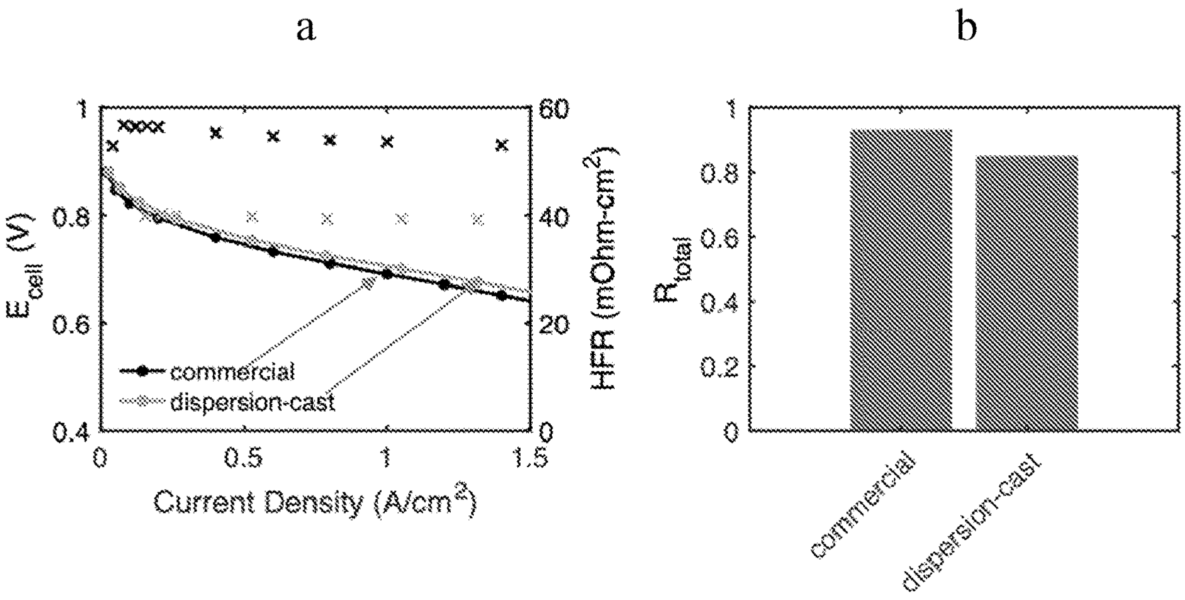
FIG. 8. Fuel cell testing results for dispersion-cast membrane. a, Uncorrected polarization curves and HFR values at selected current densities for about 0.1 $mg_{Pt}/cm^2$ MEAs made with a commercial and dispersion-cast membrane. b, Total $O_2$ resistances calculated using limiting current measurements.
Figure 9:
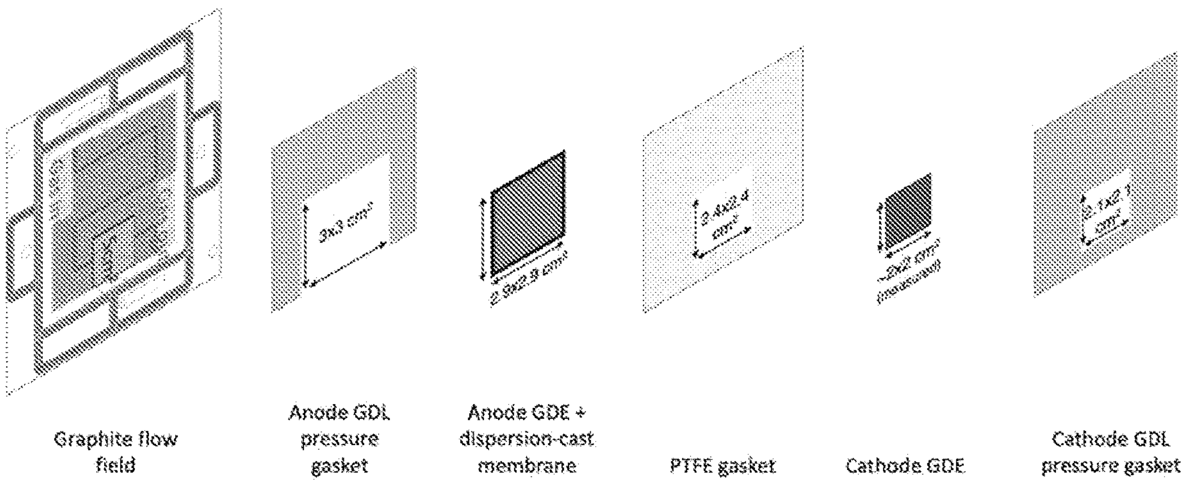
FIG. 9. Schematic for assembly of MEAs with dispersion-cast membranes.
Figure 10:
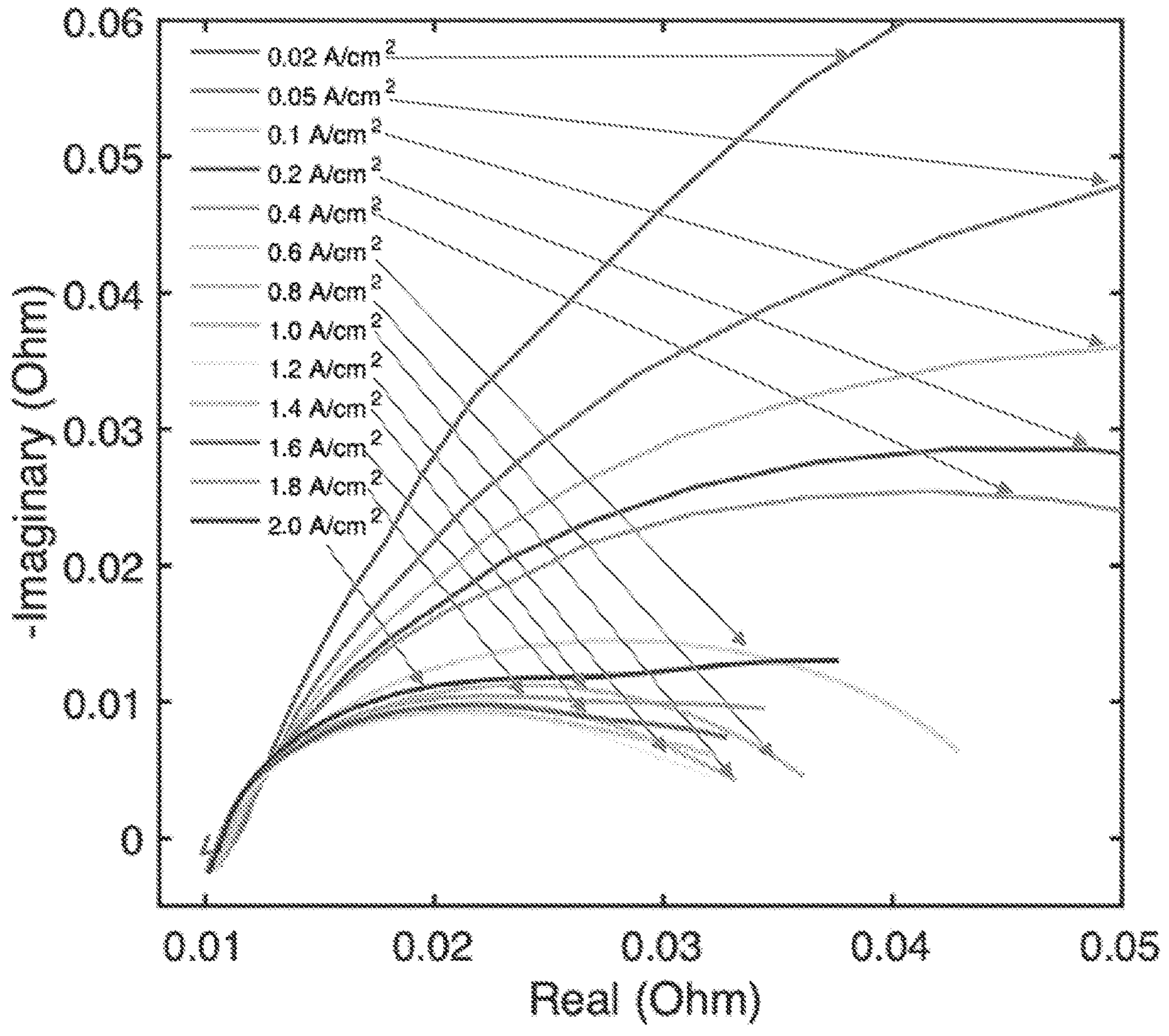
FIG. 10. A representative Nyquist plot series for an MEA tested with EC300J carbon support and an about 7.8 wt. % alcohol Nafion dispersion. At high frequencies (closest to the origin), no 45° angle feature characteristic of cathode proton resistance is apparent, indicating well-distributed ionomer.
Figure 11:
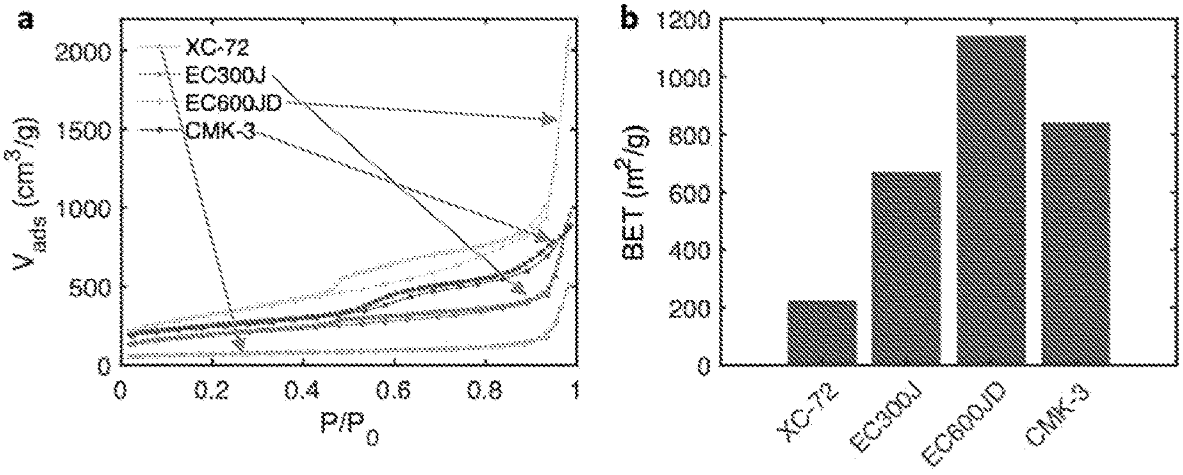
FIG. 11. $N_2$ isotherm data. a. Relative pressure isotherms for plasma-treated XC-72, EC300J, E600JD, and CMK-3 carbon supports. b. Surface areas determined using Brunauer-Emmett-Teller (BET) method.

With increasing alcohol content under about 50 wt. %, solvent properties such as viscosity and surface tension change monotonically. Because observation is made of an intermediate concentration being optimal for MEA performance in this example, these factors alone are unlikely to provide a complete explanation of the electrochemical results. Another process that is sensitive to solvent composition is the formation of ionomer agglomerates. Water-alcohol mixtures can disperse proton-conducting ionomers in large, swollen agglomerates, but the exact morphologies and sizes of these agglomerates for a given solvent environment are difficult to predict. Here, observation is made of the formation of Nafion agglomerates at the intermediate about 7.8 and about 15.6 wt. % alcohol dispersions. These agglomerates are visible to the naked eye, as shown in FIG. 7, and can be quantified using dynamic light scattering (DLS). FIG. 3*a* shows scattering intensities for each ionomer dispersion as a function of hydrodynamic diameter. Peaks between about 200 nm and about 250 nm are pronounced for the intermediate alcohol dispersions, but very little scattering is observed for the 0 and about 31.2 wt. % solutions. Thus, according to the electrochemical data, these Nafion agglomerates correlate with high catalytic performance. It is hypothesized that the enhancement originates from a reduced exposure of Pt to the ionomer. In agglomerates, polymer strands have a greater affinity for each other than surrounding dispersing molecules. Therefore, as depicted in FIG. 3*b*, Nafion in agglomerates would be less driven to follow a solvent into nanometer-scale pores in which Pt is located. Because ionomer can both poison Pt and add $O_2$ transport resistances, increased penetration for non-agglomerated dispersions would reduce both LCD and HCD performance. As for the poor performance for the about 31.2 wt. % sample relative to the 0 wt. % sample, it is hypothesized that the reduced surface tension of the high-alcohol dispersion further increases ionomer penetration. This may also explain the slight reduction in performance of the about 15.6 wt. % sample relative to the about 7.8 wt. % sample.

With agglomerated dispersions, achievement is made of relatively high activities and can account for nearly all voltage losses observed below about 1.5 $A/cm^2$. Retention of streamlined Tafel kinetics at high current densities is a major challenge in PEMFCs research, especially for porous carbons with high activities.

Carbon Porosity Effect

To examine support effects on PEMFC performance, evaluation is made of four carbon supports using the bottom-up MEA fabrication approach. Among the supports were three furnace carbon blacks with varying degrees of porosity (CB-V, CB-KB and CB-KBHSA) and one ordered mesoporous carbon (OMC) with channels templated at about 4.5 nm.

Figure 4:
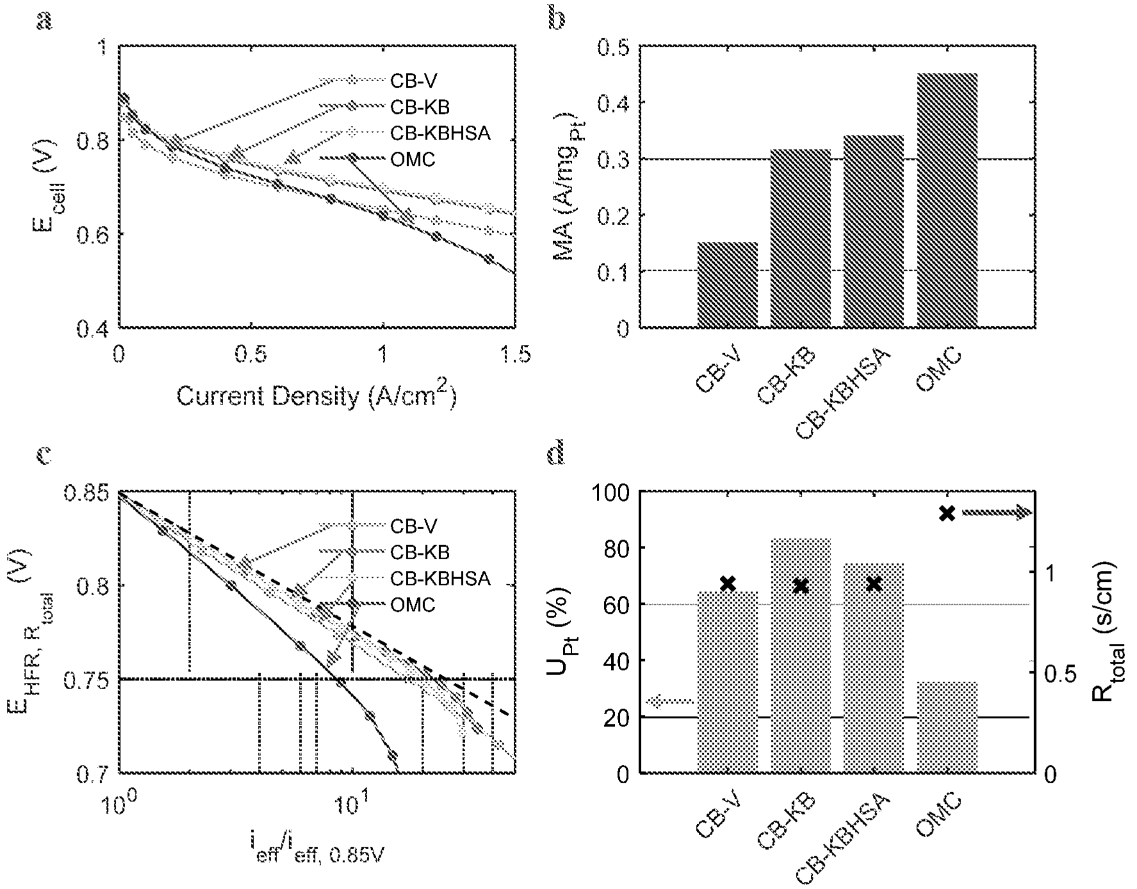
FIG. 4. Effect of carbon support structure on fuel cell performance. a, Uncorrected MEA $H_2$-air polarization curves. b, MEA $H_2$—$O_2$ MA values for cathodes prepared with ionomer dispersions containing different carbon supports. c, MEA $H_2$-air polarization curves with potentials corrected for HFR and $R_{total}$ and current densities corrected for $i_{eff}$ and normalized by the value at about 0.85V. The dashed line represents a theoretical curve following streamlined Tafel kinetics. d, $U_{Pt}$ values extracted from c (left) and $R_{total}$ values (right). Conditions: cathode loading=0.1±0.015 $mg_{Pt}/cm^2$; anode loading=about 0.1 $mg_{Pt}/cm^2$; cell temperature=about 80° C.; total outlet pressures=about 150 kPa; cathode and anode RH=about 100%; cathode flow rate=about 5000 sccm; anode flow rate=about 500 sccm.

FIG. 4 contains fuel cell testing results for 0.1+/−0.15 $mg_{Pt}/cm^2$ loaded cathodes fabricated with each carbon and the about 7.8 wt. % alcohol Nafion dispersion from the ionomer evaluation. Consistent with prior literature, CB-V-supported Pt showed lower MA than CB-KB. The more porous CB-KBHSA revealed a slightly higher LCD performance than CB-KB with an MA of about 0.34 $A/mg_{Pt}$. Finally, Pt supported on the OMC resulted in the highest MA, reaching about 0.45 $A/mg_{Pt}$ and thereby exceeding the DOE target of 0.44 $A/mg_{Pt}$.[3] In recent work demonstrating a positive correlation between MEA performance and support mesoporosity, it was argued that 4-7 nm pores are large enough not to be blocked by Pt nanoparticle growth but small enough that ionomer penetration is low. Following this perspective, $f_{4-7\ nm}$, is defined for each carbon as the fraction of Pt located within pores that presumably have restricted ionomer access. Indeed, when MA is plotted against $f_{4\text{-}7\ nm}$ (closed circles, FIG. 5*b*), a clear trend is observed. It is acknowledged that a significant portion of surface area in CB-KB and CB-KBHSA belongs to pores between 3.5 and 4 nm. While in principle Pt contained in these pores should not have reduced activity—unless Pt nucleation changes as the pore diameter approaches the nominal nanoparticle size—the 4-7 nm size range was selected following the precedence in the literature. In any case, a monotonic relationship between degree of mesoporosity and MA holds if the size range is adjusted (open circles, FIG. 5*b*), albeit with a weaker correlation.

Figure 5:
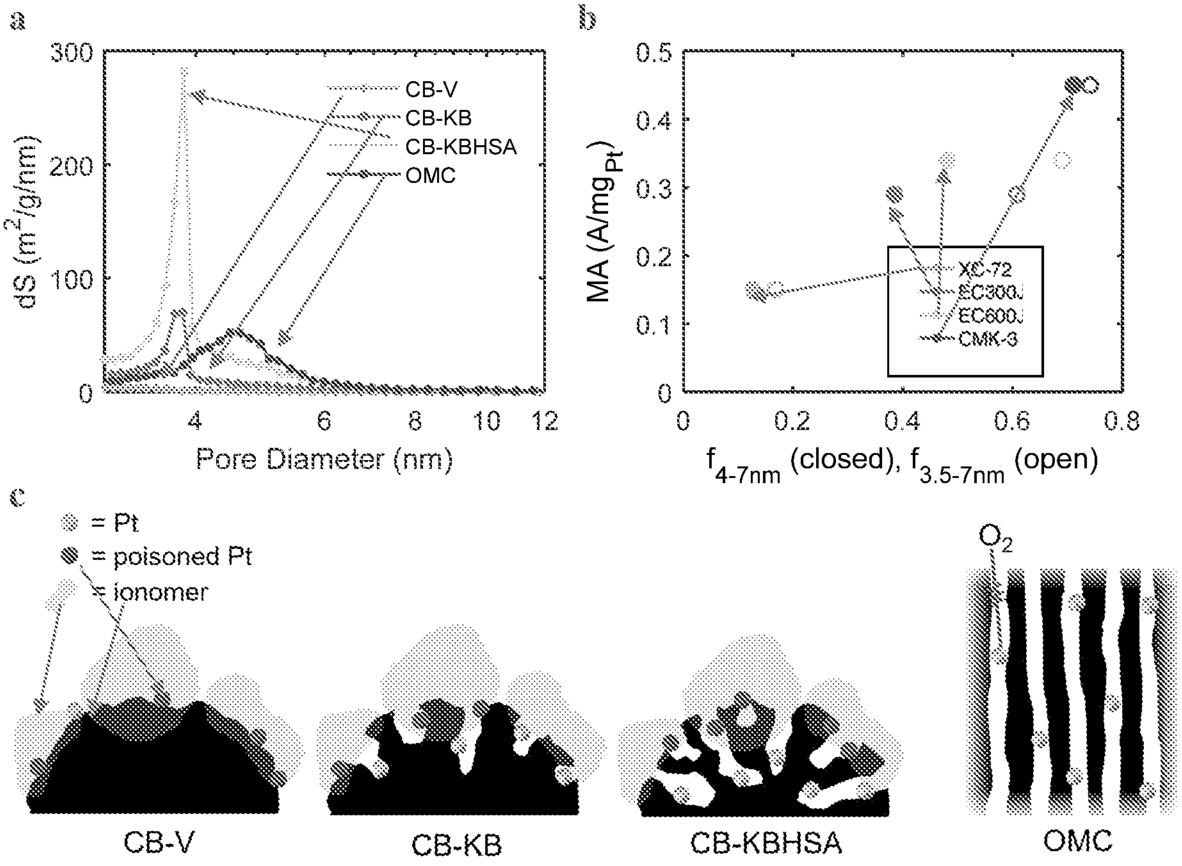
FIG. 5. Physical characterization of carbon supports. a, Pore size distribution curves calculated from $N_2$ desorption curves using Barrett-Joyner-Halenda theory. b, MA values plotted against a fraction of support surface area contained in about 4-7 nm pores. c, Illustration of proposed catalyst structures for each carbon support.

The degree of mesoporosity did not, on the other hand, predict the trend in HCD performance. The OMC, for example, yielded the lowest $U_{Pt}$ by a significant margin despite having over about 60% of surface area in about 4-7 nm pores. This poor performance may be caused primarily by the large primary particle size characteristic of OMCs. With long channels on the order of about 1 μm, $O_2$ accessibility and water removal is presumably a challenge, highlighting pore length as a key factor in HCD performance. Although pore length is challenging to measure, we can make assumptions based on the size and geometries of the carbon species tested to better understand the relationship. That is, because all the furnace carbon blacks (CB-V, CB-KB, CB-KBHSA) have 30-50 nm spherical primary particles, differences in mesoporosity should roughly translate into differences in pore length within the primary particles (as depicted in FIG. 5*c*). With no pronounced mesoporosity (see FIG. 5*a*), CB-V supports Pt predominantly on its surface. Bulk $O_2$ transport seems unhindered by the resulting exposure to ionomer ($R_{total}$ is low for XC-72), but $U_{Pt}$ suffers slightly. Pt deposited on CB-KB and CB-KBHSA, on the hand, seems to be withdrawn enough that only minor unexplained losses are observed but not so much that the diffusion length of $O_2$ is considerably increased. The slightly lower $U_{Pt}$ of CB-KBHSA compared to CB-KB may suggest that the optimum pore length was surpassed for the more porous carbon.

Among the carbon blacks tested, CB-KB produced the lowest total $O_2$ transport resistance ($R_{total}$=about 0.93 s/cm) and the greatest retention of activity ($U_{Pt}$=about 83%). Although the MA over CB-KB is respectable for pure Pt at about 0.31 A/$mg_{Pt}$, higher MA values are attainable as demonstrated with OMC tested. According to hypotheses, a carbon support with a large fraction of relatively shallow about 4-7 nm mesopores could deliver even stronger LCD and HCD performances.

Power Density Measurements with a Cast Membrane

While MA and $U_{Pt}$ are useful metrics for evaluating a cathode at low and high current densities, respectively, power density—a product of current density and an uncorrected cell potential—reveals how well an MEA would perform in a real fuel cell stack. After kinetic losses described by MA and $U_{Pt}$, ohmic losses are second greatest until $O_2$ transport losses become more significant at well over about 2 A/$cm^2$. For this reason, a high-performing membrane is desired for generating high power densities. Preparing membranes by casting an ionomer dispersion directly onto electrodes not only reduces a membrane resistance to the level of electrical resistances in the cell but also decreases $O_2$ transport resistance, likely due to back diffusion of water to an anode.

Figure 6:
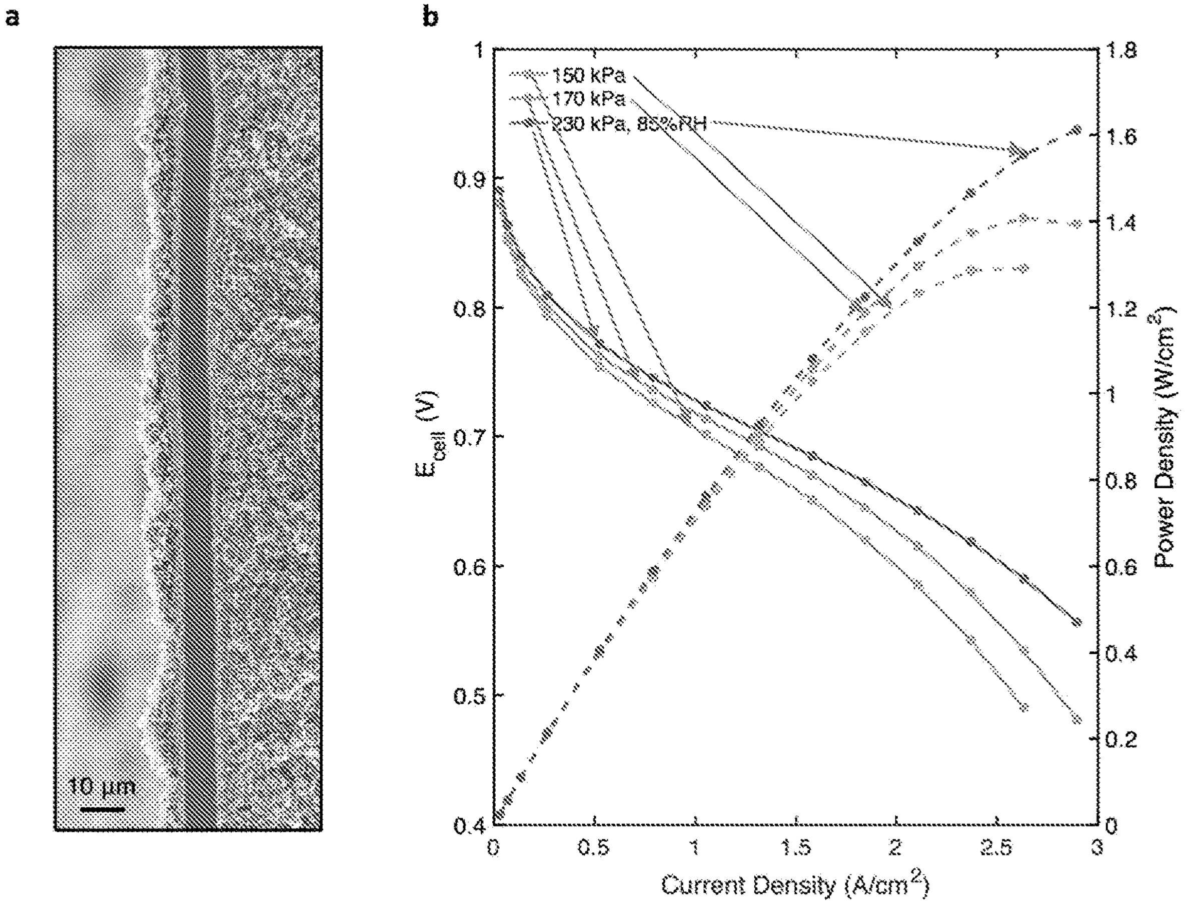
FIG. 6. Power density measurements using dispersion-cast membrane. a, Scanning electron microscopy (SEM) image of a cross-section of an MEA prepared with a dispersion cast membrane. b, Uncorrected MEA $H_2$-air polarization curves taken at various backpressures.

A ~6 μm membrane (FIG. 6*a*) was achieved on the anode and assembled with a 0.1 $mg_{Pt}$/$cm^2$ cathode fabricated using CB-KB carbon and the 7.8 wt % alcohol Nafion dispersion. With the introduction of a cast membrane, the cell resistance measured by high frequency impedance dropped to roughly 40 mOhm-$cm^2$ while the total transport resistance decreased to 0.85 s/$cm^2$. Polarization curves taken at common absolute backpressures of about 150, about 170, and about 230 kPa are displayed in FIG. 6*b*. The relevance of testing at higher backpressures is that the power density increase from more favorable thermodynamics, kinetics, and transport may outweigh the equipment and energy cost for compressing the air feed. Here, observation is made of peak power densities for the three pressures of about 1.3, about 1.4, and about 1.6, respectively. These are among the highest power densities observed at the respective backpressures for cathode loadings less than or equal to about 0.1 mg/$cm^2$. Owing to the relatively high MA achieved, intermediate current densities compare favorably to the state-of-field as well (see Table 1).

In addition to delivering high-performing PEMFCs, the bottom-up fabrication strategy for leveraging ionomer control can be generally useful to other gas diffusion electrode-driven fields; the approach may be particularly attractive in $CO_2$ electro-reduction where a catalyst-ionomer interface has an additional effect in product selectivity. Furthermore, by employing ALD to prepare Pt, demonstration is made of the feasibility of making electrodes using vapor-based syntheses on high surface area substrates without involving fluidization or agitation. The development of spatial ALD reactors can make this electrode fabrication methodology a feasible commercial alternative to comparative approaches.

Figure 12:
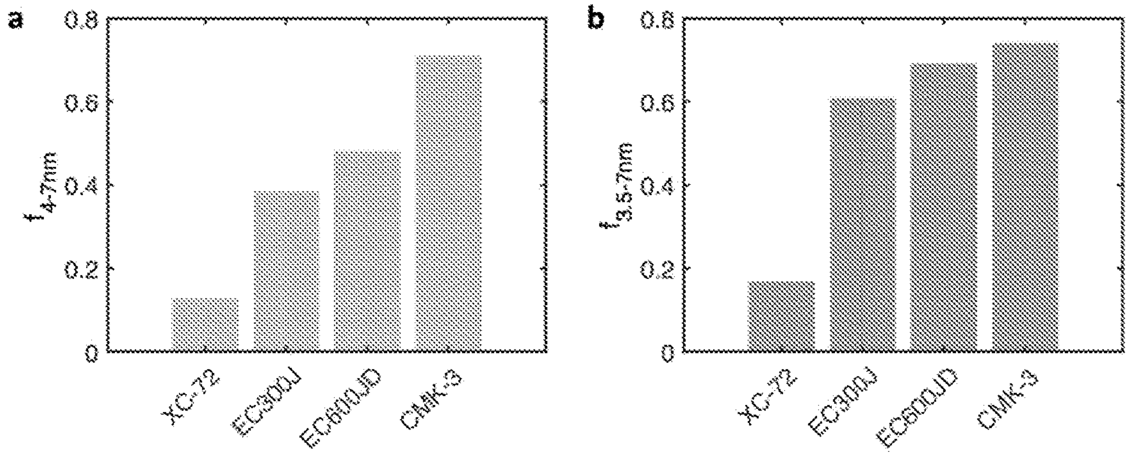
FIG. 12. Mesoporosity calculations. a, Fraction of surface area contained in about 4-7 nm pores determined using the Barrett-Joyner-Halenda method. b, Fraction of surface area contained in about 3.5-7 nm pores.

Assuming Pt nanoparticles nucleate uniformly across a carbon surface, $f_{4\text{-}7\ nm}$ describes the fraction of Pt located within these about 4-7 nm pores. One constraint to this assumption is that the growth of nominally about 3 nm Pt particles in pores of roughly that size or smaller likely changes. However, for each carbon support tested in this example, less than about 2 percent of the total surface area belonged to pores 3 nm or less, so $f_{4\text{-}7\ nm}$ is deemed an appropriate metric. As shown in FIG. 12*a*, $f_{4\text{-}7\ nm}$ rises in the carbon black series from about 0.1 in XC-72 to about 0.25 in EC600JD. With pores templated at about 4.5 nm, CMK-3 has a much higher $f_{4\text{-}7\ nm}$ of close to about 0.6.

In the above, demonstration is made of a strong correlation between f4-7nm and MA. It is noted that a significant portion of surface area in EC300J and EC600JD belongs to pores between about 3.5 and about 4 nm. While in principle Pt contained in these pores should not have a reduced activity—unless Pt nucleation is changed as the pore size approaches the nominal nanoparticle size—that size range was excluded in $f_{4\text{-}7\ nm}$. Because the trend in accessible mesopores among the carbon supports does not change if the range is extended to include pores as small as about 3.5 nm (FIG. 12*b*), $f_{4\text{-}7\ nm}$ appears to be an appropriate descriptor for LCD performance, albeit with a weaker correlation.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially," "substantial," "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In the description of some embodiments, an object "on" another object can encompass cases where the former object is directly on (e.g., in physical contact with) the latter object, as well as cases where one or more intervening objects are located between the former object and the latter object.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A manufacturing process comprising:

depositing a first catalyst on a first gas diffusion layer to form a first catalyst-coated gas diffusion layer;

depositing a first ionomer on the first catalyst-coated gas diffusion layer to form a first gas diffusion electrode;

depositing a second catalyst on a second gas diffusion layer to form a second catalyst-coated gas diffusion layer;

depositing a second ionomer on the second catalyst-coated gas diffusion layer to form a second gas diffusion electrode; and laminating the first gas diffusion electrode with the second gas diffusion electrode and with an electrolyte membrane disposed between the first gas diffusion electrode and the second gas diffusion electrode to form a membrane electrode assembly, wherein:

a first catalyst support comprises a porous carbonaceous layer having pores with diameters in a range of about 1 nm to about 8 nm;

the electrolyte membrane has a thickness of 15 μm or less;

the first ionomer is in the form of agglomerates having sizes in a range of about 20 nm to about 10,000 nm; and the first ionomer is present within the first catalyst layer in a concentration gradient, wherein a concentration of the first ionomer adjacent to a first interface between the first catalyst layer and the electrolyte membrane is at least about 1.1 times greater than the concentration of the first ionomer at a position halfway between the first interface and the second interface between the first catalyst layer and the first gas diffusion layer, and the concentration at the position halfway between the first interface and a second interface is at least about 1.1 times greater than the concentration of the first ionomer adjacent to the second interface.

2. The manufacturing process of claim 1, further comprising depositing the first catalyst support on the first gas diffusion layer to form a first catalyst support-coated gas diffusion layer, and wherein depositing the first catalyst on the first gas diffusion layer includes depositing the first catalyst on the first catalyst support-coated gas diffusion layer to form the first catalyst-coated gas diffusion layer.

3. The manufacturing process of claim 2, further comprising depositing a second catalyst support on the second gas diffusion layer to form a second catalyst support-coated gas diffusion layer, and wherein depositing the second catalyst on the second gas diffusion layer includes depositing the second catalyst on the second catalyst support-coated gas diffusion layer to form the second catalyst-coated gas diffusion layer.

4. The manufacturing process of claim 1, wherein depositing the first catalyst is performed by atomic layer deposition.

5. The manufacturing process of claim 4, wherein depositing the second catalyst is performed by atomic layer deposition.

6. The manufacturing process of claim 1, further comprising forming the electrolyte membrane on the first gas diffusion electrode, prior to laminating the first gas diffusion electrode with the second gas diffusion electrode.

7. The manufacturing process of claim 6, wherein forming the electrolyte membrane is performed by casting or molecular layer deposition.

8. The manufacturing process of claim 6, further comprising depositing a radical scavenger to form a scavenger layer on the electrolyte membrane.

9. The manufacturing process of claim 1, wherein depositing the first ionomer includes at least partially impregnating the first ionomer into a first catalyst layer of the first catalyst-coated gas diffusion layer.

10. The manufacturing process of claim 9, wherein depositing the second ionomer includes at least partially impregnating the second ionomer into a second catalyst layer of the second catalyst-coated gas diffusion layer.

11. A manufacturing process comprising:

depositing a catalyst support on a first gas diffusion layer to form a catalyst support-coated gas diffusion layer;

depositing a first catalyst on the catalyst support-coated gas diffusion layer to form a catalyst-coated gas diffusion layer;

depositing an ionomer on the catalyst-coated gas diffusion layer to form a gas diffusion electrode;

forming an electrolyte membrane on the gas diffusion electrode;

depositing a second catalyst on the electrolyte membrane to form a catalyst-coated gas diffusion electrode; and laminating the catalyst-coated gas diffusion electrode with a second gas diffusion layer to form a membrane electrode assembly, wherein:

the first gas diffusion layer comprises a porous carbonaceous layer having pores with diameters in a range of about 1 nm to about 8 nm;

the electrolyte membrane has a thickness of 15 μm or less;

the ionomer is in the form of agglomerates having sizes in a range of about 20 nm to about 10,000 nm; and the first ionomer is present within the first catalyst layer in a concentration gradient, wherein a concentration of the first ionomer adjacent to a first interface between the first catalyst layer and the electrolyte membrane is at least about 1.1 times greater than the concentration of the first ionomer at a position halfway between the first interface and a second interface between the first catalyst layer and the first gas diffusion layer, and the concentration at the position halfway between the first interface and the second interface is at least about 1.1 times greater than the concentration of the first ionomer adjacent to the second interface.

12. The manufacturing process of claim 11, wherein depositing the ionomer is according to a gradient in concentration of the ionomer along a direction towards the first gas diffusion layer.

13. The manufacturing process of claim 11, wherein depositing the ionomer is according to a gradient in at least one of chemical composition or molecular weight of the ionomer along a direction towards the first gas diffusion layer.

14. A membrane electrode assembly for a fuel cell, comprising:

a first gas diffusion layer comprising a first catalyst support, wherein the first catalyst support comprises a porous carbonaceous layer, the porous carbonaceous layer having pores with diameters in a range of about 1 nm to about 8 nm;

a second gas diffusion layer;

an electrolyte membrane disposed between the first catalyst support of the first gas diffusion layer and the second gas diffusion layer;

a first catalyst layer disposed between the first gas diffusion layer and the electrolyte membrane, the first catalyst layer comprising a first ionomer; and a second catalyst layer disposed between the second gas diffusion layer and the electrolyte membrane, wherein a thickness of the electrolyte membrane is 15 μm or less, and wherein the first ionomer is in the form of agglomerates having sizes in a range of about 20 nm to about 10,000 nm; and wherein the first ionomer is present within the first catalyst layer in a concentration gradient, wherein a concentration of the first ionomer adjacent to a first interface between the first catalyst layer and the electrolyte membrane is at least about 1.1 times greater than the concentration of the first ionomer at a position halfway between the first interface and a second interface between the first catalyst layer and the first gas diffusion layer, and the concentration at the position halfway between the first interface and the second interface is at least about 1.1 times greater than the concentration of the first ionomer adjacent to the second interface.

15. The membrane electrode assembly of claim 14, wherein a concentration of the first ionomer varies within the first catalyst layer along a direction towards the first gas diffusion layer.

16. The membrane electrode assembly of claim 15, wherein the second catalyst layer includes a second ionomer, and a concentration of the second ionomer varies within the second catalyst layer along a direction towards the second gas diffusion layer.

17. The membrane electrode assembly of claim 14, further comprising a scavenger layer disposed between the electrolyte membrane and the second catalyst layer.

18. A fuel cell comprising the membrane electrode assembly of claim 14.

* * * * *